United States Patent
Busch

(10) Patent No.: US 9,830,464 B2
(45) Date of Patent: Nov. 28, 2017

(54) FORMAT PRESERVING ENCRYPTION

(71) Applicant: Passport Health Communications, Inc., Franklin, TN (US)

(72) Inventor: Christopher Gerhard Busch, Maple Grove, MN (US)

(73) Assignee: PASSPORT HEALTH COMMUNICATIONS, INC., Franklin, TN (US)

( * ) Notice: Subject to any disclaimer, the term of this patent is extended or adjusted under 35 U.S.C. 154(b) by 99 days.

(21) Appl. No.: 15/003,474

(22) Filed: Jan. 21, 2016

(65) Prior Publication Data

US 2017/0214521 A1 Jul. 27, 2017

(51) Int. Cl.
G06F 21/62 (2013.01)
H04L 9/06 (2006.01)
G06F 17/30 (2006.01)

(52) U.S. Cl.
CPC ........ *G06F 21/62* (2013.01); *G06F 17/30477* (2013.01); *H04L 9/0618* (2013.01); *H04L 2209/24* (2013.01); *H04L 2209/34* (2013.01)

(58) Field of Classification Search
CPC ...................................................... G06F 21/62
See application file for complete search history.

(56) References Cited

U.S. PATENT DOCUMENTS

| | | | |
|---|---|---|---|
| 7,864,952 B2 | 1/2011 | Pauker et al. | |
| 2010/0074441 A1* | 3/2010 | Pauker | H04L 9/0625 380/45 |
| 2011/0103579 A1* | 5/2011 | Martin | G06F 21/602 380/28 |
| 2011/0280394 A1* | 11/2011 | Hoover | H04L 9/0618 380/28 |
| 2012/0173865 A1* | 7/2012 | Swaminathan | H04L 9/0637 713/150 |
| 2013/0064368 A1* | 3/2013 | Lefebvre | H04N 21/2389 380/217 |

(Continued)

OTHER PUBLICATIONS

Liu et al.; Format-preserving encryption for DateTime; Published in: Intelligent Computing and Intelligent Systems (ICIS), 2010 IEEE International Conference on; Date of Conference: Oct. 29-31, 2010; IEEE Xplore.*

(Continued)

*Primary Examiner* — Bradley Holder
(74) *Attorney, Agent, or Firm* — Merchant & Gould

(57) ABSTRACT

Encrypting data without losing their format is important in computing systems, because many parties using confidential data rely on systems that require specific formatting for data. Information security depends on the systems and methods used to store and transmit data as well as the keys used to encrypt and decrypt those data. A policy broker is disclosed that maintains keys for clients in confidence, while providing cryptographically secure ciphertext as tokens that the clients may use in their systems as though they were the unencrypted data. Tokens are uniquely constructed for each client by the policy broker based on policies set by a receiving client detailing the formatting needs of their systems. Each client may communicate with other clients via the policy broker with the tokens and will send tokens unique to their system that the policy broker will translate into the tokens of the other party.

20 Claims, 11 Drawing Sheets

(56) References Cited

U.S. PATENT DOCUMENTS

| | | | | |
|---|---|---|---|---|
| 2014/0108813 A1* | 4/2014 | Pauker | ................ | G06F 21/6218 |
| | | | | 713/189 |
| 2014/0115328 A1* | 4/2014 | Allen | ...................... | H04L 29/06 |
| | | | | 713/165 |
| 2015/0244518 A1* | 8/2015 | Koo | ........................ | G09C 1/00 |
| | | | | 380/44 |
| 2015/0341166 A1* | 11/2015 | Minematsu | ........... | H04L 9/0625 |
| | | | | 380/28 |
| 2015/0358159 A1* | 12/2015 | Rozenberg | ................ | H04L 9/14 |
| | | | | 380/28 |
| 2016/0224802 A1* | 8/2016 | Arnold | .............. | G06F 17/30312 |
| 2016/0358163 A1* | 12/2016 | Kumar | ............... | G06Q 20/3823 |
| 2017/0026170 A1* | 1/2017 | Farkash | ................ | H04L 9/0618 |
| 2017/0170952 A1* | 6/2017 | Hart | ...................... | H04L 9/0618 |

OTHER PUBLICATIONS

Pandey et al.; Property preserving symmetric encryption; Published in: Proceeding EUROCRYPT'12 Proceedings of the 31st Annual international conference on Theory and Applications of Cryptographic Techniques; 2012; pp. 375-391; ACM Digital Library.*

* cited by examiner

```
210a   MSH|^~\&|ADT1|MNG|LABPSPT|MNG|20150919140O|SECURITY|ADT^A01|MSG00001-|P|2.3
210b   EVN|A01|20150919112 3
210c   PID|||12345^M11|DOE^JOHN^Q^III|||19700101|M||C|
       120^OAK^ST^ANYTOWN^FR^12345-6789|USA|8655551212|
       8655553434||M|||12345^M1||12345678 9|FR987654
210d   NK1|1|DOE^JANE^Q|WIFE|||||NK
210e   PV1|||I|500^528^01||||080290^HACKENBUSH^HUGO^Z|||SUR||-||ADM|AO-
210f   AL1|1||Penicillin||Allergic
210g   AL1|2||Horse^dander|Rash
```

Fig. 2A

FORMAT PRESERVING ENCRYPTION

BACKGROUND

Encryption is key to maintaining the confidentiality of data stored in electronic documents. As parties hold ever greater amounts of electronic data over longer periods of time, the value of those data to attackers increases, and the risk that a breach that exposes those data also increases. Although several methods of encryption currently exist, many of these methods rely on sharing keys over open channels and that all parties with whom the data are shared use good security practices to store the data. As the same data are shared between parties with various levels of security, the confidentiality of the data is only as good as the security of the party with the weakest security. Legacy systems, however, often require data to arrive in specific formats, and strong encryption can alter the format of data so that they are not compatible with a legacy system. It is often expensive or unfeasible to rework or replace these legacy systems, which can weaken the security of a party and expose confidential data to an increased risk of a harmful data breach.

BRIEF SUMMARY

The present disclosure provides systems and methods for preserving the structure of data while encrypting them so that the risk and extent of a potential data breach is reduced. Encrypted data may therefore be interpreted and acted upon by a computer system as though they were unencrypted. This is achieved, in part, by only sharing portions of confidential data in an unencrypted form on a need-to-know basis between parties. When confidential data are shared between parties, those portions to which the receiving party does not have a need-to-know are encrypted by a multi-part cipher that preserves the format of the encrypted portions from the untokenized data. The receiving party may use these encrypted data as though they were unencrypted, and when such data are used to communicate with the sending party, the sending party receives back the data in an unencrypted form. Only the data to which the receiving party has a need-to-know are in plaintext for the receiving party, and each receiving party has a unique ciphertext for the same encrypted plaintext.

As used herein, and as will be understood by one of ordinary skill in the art, examples will be given in terms of personal names (e.g., Alice, Bob, Carol) corresponding to different parties rather than numerical recitations of the parties (e.g., a first party, second party, third party). For example, using the present disclosure, Alice may transmit data to Bob and Carol, who have need-to-know for a first section and a second section respectively. Bob is transmitted plaintext for the first section, but not the second section, whereas Carol is transmitted plaintext for the second section, but not the first section. In this way, an outside party without access to the data (commonly referred to as "Eve" when eavesdropping on the communication of the data and as "Mallory" when maliciously accessing stored data or attacking the transmission) who gains access to Bob's or Carol's version of the data will not gain the whole picture that Alice has; mitigating the risk of Alice sharing the data with Bob and Carol regardless of the other security practices used by Bob or Carol.

To enable each party to limit which data are received in an unencrypted form, the multi-part cipher is applied by the receiving party or a trusted intermediary (commonly referred to as "Trent") on behalf of the receiving party. The first cipher, referred to as "cipher A," adds randomness to the plaintext while the second cipher, referred to as "cipher B," limits the output ciphertext to the domain of characters used by the plaintext. Cipher B operates in electronic codebook mode, which provides consistent outputs for a given plaintext to a given receiver. Cipher A is applied in conjunction with cipher B to add randomness to the output of cipher B and thereby improve its cryptographic strength so that the codebook of cipher B cannot be learned by a receiving or intercepting party over repeated uses. By combining cipher A and cipher B, the resulting ciphertext is consistent for a given plaintext for a given receiving party, and more secure, while retaining the size and domain of the given plaintext.

By employing the present disclosure, Alice can prevent Bob from accessing plaintext data which he lacks need-to-know for, prevent Bob and Carol from comparing data to reassemble the complete data that Alice has (or Eve or Mallory from compiling the data to do the same), while providing Bob and Carol with data that are compatible and usable in their respective systems. For example, if Alice sends data of a social security number (SSN) of 123-45-6789 to Bob and Carol, Bob will receive an encrypted SSN of, for example, 831-41-5926, and Carol will receive an encrypted SSN of, for example, 927-18-2818. The numbers that Bob and Carol receive retain the format of a nine-digit SSN (i.e., nine numeric characters) so that Bob and Carol may use the encrypted SSNs in their systems as though they were the unencrypted SSN. When Alice receives communications from Bob or Carol that include their encrypted SSNs, Alice (or Trent on behalf of Alice) is able to decrypt the SSNs so that when Alice communicates with Bob or Carol, each party will be able to refer to the same person associated with the SSN despite each of the parties using a different "SSN" for that person.

The systems and methods provided in the present disclosure overcome problems specific to computers that result in improvements to the computers that employ the present disclosure. By using the present disclosure, less memory is required than in prior systems and methods, without sacrificing the security of the encrypted data. Additionally, the use of the present disclosure produces improved security for those data, such that a party with lax security does not jeopardize the security of parties with vigilant security.

Aspects of systems and methods described herein may be practiced in hardware implementations, software implementations, and in combined hardware/software implementation. This summary is provided to introduce a selection of concepts; it is not intended to identify all features or limit the scope of the claimed subject matter.

BRIEF DESCRIPTION OF THE DRAWINGS

The accompanying drawings, which are incorporated in and constitute a part of this disclosure, illustrate various aspects and examples of the present invention. In the drawings:

FIGS. 2A and 2B illustrate examples of an untokenized structured document layout and a tokenized structured document layout;

DETAILED DESCRIPTION

Figure 1:
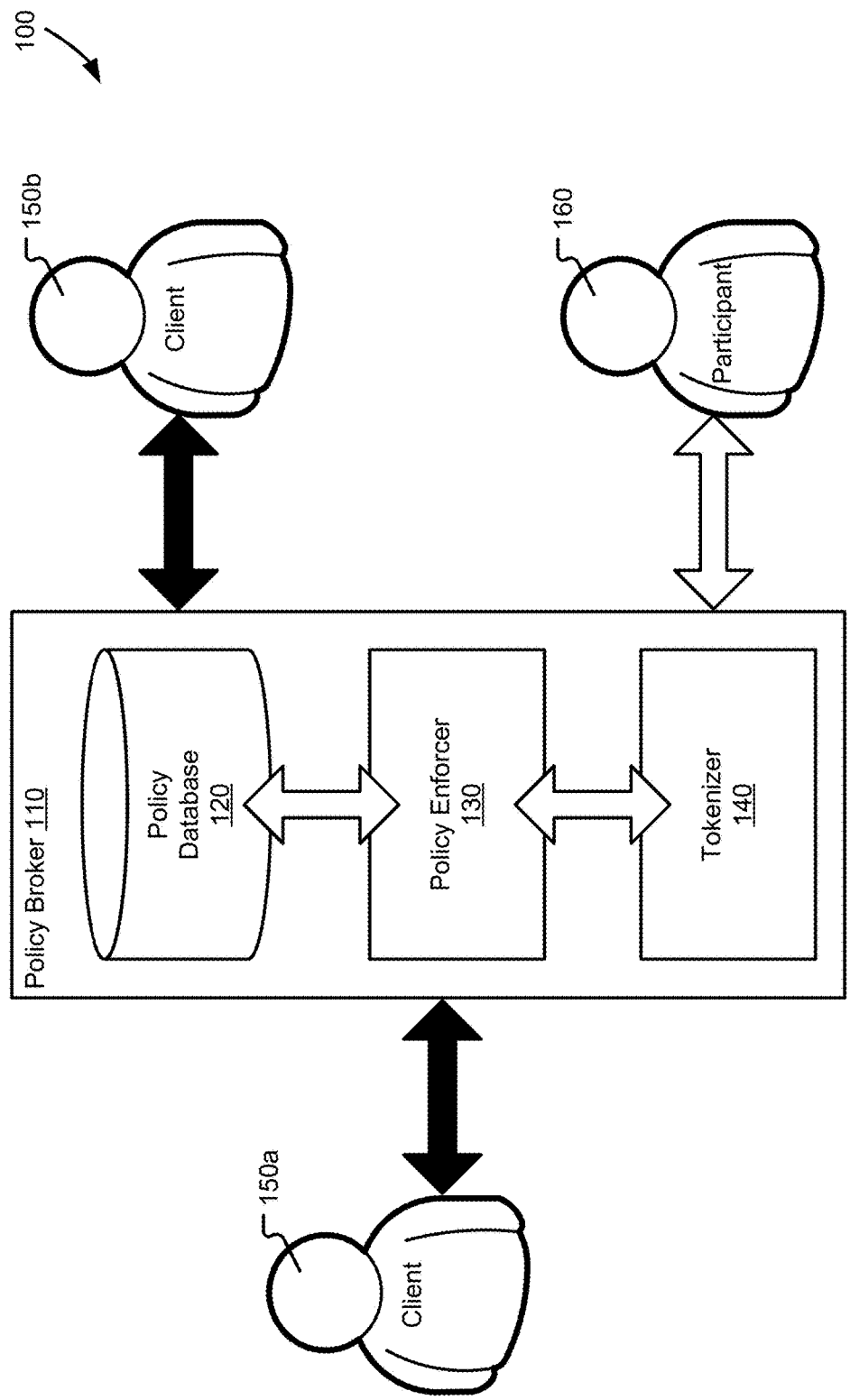
FIG. 1 is a block diagram of a format preserving encryption system by which three parties are communicating.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

The present disclosure provides systems and methods for preserving the structure of data while encrypting them into tokens so that the risk and extent of a potential data breach is reduced. Tokenized data may therefore be interpreted and acted upon by a computer system as though they were plaintext (i.e., unencrypted). When confidential data are shared between parties, those portions to which the receiving party does not have a need-to-know are tokenized by a multi-part cipher that preserves the format of the tokenized potions from the untokenized data. The receiving party may use these tokenized data as though they were unencrypted, and when such data are used to communicate with the sending party, the sending party is enabled to reverse the tokenization so that it may use the plaintext. Only the data to which the receiving party has a need-to-know are in plaintext for the receiving party, and each receiving party will have a unique ciphertext for the same tokenized data.

As used herein, and as will be understood by one of ordinary skill in the art, examples will be given in terms of personal names (e.g., Alice, Bob, Carol) corresponding to different parties rather than numerical recitations of the parties (e.g., a first party, second party, third party). For example, using the present disclosure, Alice may transmit data to Bob and Carol, who have need-to-know for a first section and a second section respectively. Bob receives plaintext of the first section, and a token for the second section. Similarly, Carol receives plaintext of the second section, and a token for the first section. In this way, an outside party without access to the data (commonly referred to as "Eve" when eavesdropping on the communication of the data and as "Mallory" when actively attacking stored data) who gains access to Bob's or Carol's version of the data will not gain the whole picture that Alice has; mitigating the risk of Alice sharing the data with Bob and Carol regardless of the security practices used by Bob or Carol while still enabling Bob and Carol to use the encrypted data within their systems as though they were unencrypted.

To enable each party to limit which data are shared, a multi-part cipher is applied by the sending party or a trusted intermediary (commonly referred to as "Trent") on behalf of the receiving party. The first cipher, referred to as "cipher A," adds randomness to the plaintext while the second cipher, referred to as "cipher B," limits the output ciphertext to the domain of characters used by the plaintext. Cipher B operates in electronic codebook mode, which provides consistent outputs for a given plaintext to a given receiver. Cipher A is applied in conjunction with cipher B to add randomness to the output of cipher B, and thereby improves its cryptographic strength so that the codebook of cipher B cannot be learned by a receiving or intercepting party over repeated transmissions. By combining cipher A and cipher B, the resulting ciphertext is consistent for a given plaintext for a given receiving party, and more secure, while retaining the size and domain of the given plaintext.

By employing the present disclosure, Alice can prevent Bob from accessing data which he lacks need-to-know for, prevent Bob and Carol from comparing data to reassemble the complete data that Alice has (or Eve or Mallory from compiling the data to do the same), while providing Bob and Carol with data that are compatible and usable in their respective systems. For example, if Alice sends data of a social security number (SSN) of 123-45-6789 to Bob and Carol, Bob will receive an encrypted SSN token of, for example, 831-41-5926, and Carol will receive an encrypted SSN token of, for example, 927-18-2818. The numbers that Bob and Carol receive retain the format of a nine-digit SSN (i.e., nine numbers) so that Bob and Carol may use the encrypted SSN tokens in their systems as though they were the unencrypted SSN. When Alice receives communications from Bob or Carol that include their encrypted SSN tokens, Alice (or Trent on behalf of Alice) is able to decrypt the SSN tokens so that when Alice communicates with Bob or Carol, each party will be able to refer to the same person associated with the SSN despite each of the parties using a different SSN for that person.

Because the parties may use supplemental methods of encryption in addition to that disclosed herein, hereinafter the terms "tokenization," "tokenizing," "token," and variants thereof are used to distinguish the processes, actions, and outputs of the present disclosure's encryption from supplemental encryption and the individual encryptions of cipher A and cipher B. For example, Alice may tokenize portions of data according to the present disclosure so that they are encrypted according to cipher A and cipher B, and then encrypt the message including tokens for transmission to Bob according to a supplemental encryption. Bob may then decrypt the transmission from Alice according to the supplemental encryption, and the plaintext of the message will include tokens, which are the portions of the data that are encrypted according to both cipher A and cipher B. Bob does not need to detokenize the tokens, because they share their format with the original data and therefore are usable in Bob's system as-is.

Examples of numbers in the present disclosure are given in base ten unless noted otherwise. When a different base is used, a subscript beginning with the character "x" and the base value will follow the number. For example, the number ten may be designated as 10, $A_{x16}$, or $1010_{x2}$ for decimal, hexadecimal, and binary examples respectively. Additionally, for numbers given in binary formats, numbers will be presented in groups of four with spaces between each group. For example, the number one is presented as $0001_{x2}$ and the number seventeen is presented as $0001\ 0001_{x2}$. One of ordinary skill in the art will be familiar with different bases and their uses and presentation as used herein.

The systems and methods provided in the present disclosure overcome problems specific to computers that result in improvements to the computers that employ the present disclosure. A system using the present disclosure will use less memory and processing power to work with encrypted data than systems using prior methods, without sacrificing the security of the encrypted data. Additionally, the use of the present disclosure produces improved security for those data such that a party with lax security does not jeopardize the security of parties with vigilant security.

FIG. 1 is a block diagram of a format preserving encryption (FPE) system 100 by which three parties are communicating. The parties communicate with each other via a policy broker 110, which is operable to encrypt and decrypt data passed between parties. As will be understood, more or fewer than three parties may communicate according to the present disclosure. As will also be understood, the policy broker 110 may be a trusted intermediary used for communications between parties, and the policy broker 110 may be accessed by a single party via a query.

Data transmitted between parties are passed through a policy broker 110, which includes a policy database 120 to store policies, a policy enforcer 130 to determine which portions to tokenize based on the policies, and a tokenizer 140 to tokenize (i.e., encrypt according to the present disclosure) data based on the determinations. In various aspects, policy enforcer 130 is further operable to use the policies to determine which data to detokenize, and the tokenizer 140 is also operable to detokenize the data based on the determinations.

The policy broker 110 is further operable to deal with supplemental encryption used for transmission between the parties. When the data are received by the policy broker 110 as ciphertext according to a supplemental encryption, the ciphertext is decrypted into plaintext before the policy enforcer 130 determines whether to de/tokenize portions of the data. Similarly, the policy broker 110 is operable to encrypt the plaintext (including tokenized plaintext) for transmission to a receiving party according to a supplemental encryption.

As illustrated, the parties communicating via the policy broker 110 include a first client 150a, a second client 150b (collectively, clients 150), and a participant 160. Clients 150 are distinguished from participants 160 in that they are able to set policies for themselves on how data are to be tokenized. For example, if Alice is a client 150, she may set policies that dictate what data she wants to deal with as tokens instead of as plaintext. For example, to limit her liability in the event of a data breach or to lower the value of her data to a malicious party, Alice may set policies to use tokens for every field. If Bob is also a client 150, he may also set policies that dictate what data he wants to deal with as tokens, which differ from Alice's policies. For example, Bob may need to place telephone calls to customers, and will deal with tokens for every field except for "name" and "telephone number". If Carol, however, is a participant 160, she may not specify her own policies on how data she receives are to be tokenized. In various aspects, participants 160 may be sent the tokens of the transmitting party or the plaintext. For example, when Alice communicates with Carol, Carol receives $token_{Alice}$ or plaintext, and when Bob communicates with Carol, she receives $token_{Bob}$ or plaintext. When tokens are sent to Carol, she may be informed that the data she receives (or which data fields thereof) are tokens so that she may treat them differently than known plaintext data, and the tokenizer 140 may be notified when Carol later communicates with the token to the client 150 who sent her the token. All of the parties, however, may specify the use of supplemental encryption between one another and the policy broker 110.

Communications between each party and the policy broker 110 may be supplementally encrypted and/or sent over a Virtual Private Network (VPN) so that data in transit are resistant to eavesdropping, however, the policy broker 110 uses the plaintext of the data, not the ciphertext, when performing its tokenization. For example, Alice and Bob may each specify a supplemental encryption method for communicating to and from the policy broker 110 (via e.g., Advanced Encryption Standard (AES), Data Encryption Standard (DES), Pretty Good Privacy (PGP), Lucifer, etc.).

When Alice transmits data to Bob via the policy broker 110, the policy broker 110 will decrypt Alice's data, per Alice's supplemental encryption, detokenize any portion of the data indicated as a token by Alice's policies, tokenize any portion of the data indicated by the policies set by Bob, and encrypt the data per Alice's or Bob's supplemental encryption, and transmit the data to Bob. Supplemental encryption is advised so that an eavesdropper or man-in-the-middle cannot gain access to the data or portions of the data as plaintext.

Clients 150 are able to set up various policies for how data are to be tokenized. Policies are set according to the recipient's needs or desires to use plaintext in the various fields within a structured electronic document. For example, Alice may specify that all fields containing Personally Identifiable Information (PII) are tokenized. Similarly, Bob may specify a policy that the data of an SSN field will be tokenized, but that a telephone number field will not be tokenized. As will be understood, other policies for which parties have which fields tokenized are possible. Additional discussion on structured documents is given in relation to FIGS. 2A and 2B.

The policies are stored in a policy database 120 to be retrieved by a policy enforcer 130. Cryptographically secure random numbers (such as keys) may also be stored by the policy database 120 for various clients. The policy enforcer 130 is operable to parse the structure and contents of the data to determine how to enforce the policy set by the client 150. The policy enforcer 130 reads the data, looking for tags or callouts indicated in the policy, to identify portions of the data that will be tokenized or detokenized. For example, when the policy enforcer 130 uses a policy that specifies that persons' names are to be tokenized for the given client 150, the data are parsed for tags that identify a name of a person. The policy enforcer includes a dictionary of equivalent field identifiers so that variations in structure can be accounted for. Continuing the example, the policy enforcer 130 may search for field tags or callouts, such as, for example, "fname," "lname," "FirstName," "Name_Last," etc., that have been designated in the dictionary as referencing names. Similarly, segments may be identified from a dictionary of segment identifiers for segments are known to contain fields comprising data to be tokenized. For example, the policy enforcer 130 may identify a "personal information" segment that contains "name", "address", and "phone number" fields that may be identified based on their position within the segment or delineating characters within the segment.

In some aspects, the policy enforcer 130 is further operable to take the contents of a designated field to search the contents from other fields for tokenization. For example, the contents of a name field of "John Doe" may be searched for in the other fields to ensure that the name does not appear in a field whose tag or callout is not included in the dictionary, or was misfiled. For example, a personal name may appear in a billing address or mailing address field or a free-form text portion of the data in addition to a designated name field or fields. The policy enforcer 130 is operable to combine related fields and use variants thereof when searching in other fields. For example, the name "John Doe" may be combined from a first name field and a last name field, and the policy enforcer may search for "John," for "Doe," for "John Doe," for "john doe," for "Doe, John," for "J. Doe," as well as other variants of the related fields known to the policy enforcer 130.

Once a field has been identified by the policy enforcer 130 as matching the policy, or the contents of a field are identified as matching another field which matches the policy, the field's contents are sent to the tokenizer 140 to be tokenized. Tokenization is achieved on a character-by-character basis, so the tokenizer will break the plaintext to be tokenized (or the token to be detokenized) into individual characters when applying the tokenization ciphers.

The tokenizer 140 stores the ciphers that are applied to the portions of data sent to it and is operable to return tokens when plaintext is passed to it and plaintext when tokens are passed to it. The tokenizer 140 stores keys and other cryptographically secure random numbers for use in a multi-part encryption (or decryption) that are specific to each client 150. For example, using the client-specific keys, the ciphers used to communicate to Alice will produce different results than when they are used to communicate to Bob. However, when the same data are transmitted to a given client 150, they are tokenized the same way. For example, when Alice has "ABC" tokenized as "XYZ," Alice will always receive "XYZ" whenever a token or plaintext for "ABC" is sent to her. When the plaintext "ABC" is transmitted to Bob (or another client 150), however, it will be tokenized differently and Bob will always receive that token for that given plaintext. As will be appreciated, due to the nature of random numbers, there is a slight chance that Bob may, like Alice, receive a token of "XYZ" for a plaintext of "ABC", but how that tokenization is reached is different for each client 150.

To ensure that communications are consistent between parties, the tokenizer 140 is operable to use the policies set by a receiving client 150 to determine which fields the client 150 will receive as tokens, and detokenize (and retokenize when appropriate) those fields accordingly when that client 150 attempts to transmit the tokenized data to another party. For example, when Alice transmits data to Bob, Bob will receive the data including $token_{Bob}$ for the fields set by Bob's policies. The tokenizer 140 may receive the data from Alice as pure plaintext or including $token_{Alice}$, which will be converted to pure plaintext (i.e., any tokens will be detokenized), before the data are tokenized according to Bob's policies.

As will be understood, if parties attempt to communicate to each other directly as well as through the policy broker 110, the receiving party may have to deal with multiple records using various tokens and multiple records using plaintext unless the communications can be reconciled to a common entity. For example, if Carol is a patient of Alice, who uses tokens for SSNs, when Carol provides Alice with her plaintext SSN, Alice may already have a token for Carol's SSN that Alice uses for her records. Therefore, to ensure consistency in client records, clients 150 may query the policy broker 110 with a plaintext and a data source to produce a token, and then use that token to compare with its own records.

Continuing the example, Alice may query the policy broker 110 with Carol's SSN and Carol's name (or other unique identifier) to determine if Carol is a client 150 or a participant 160. If Carol is a participant 160, or the policy broker 110 cannot identify Carol as a client 150 (e.g., misspelled name or other unique identifier), the policy broker 110 will tokenize the data from Carol according to Alice's policies and keys and return the token of the data to Alice. If Carol, as the data source, is a client 150, the policy manager will perform the steps as though Carol were a participant 160 and will detokenize the data according to Carol's policies and keys, retokenize the data according to Alice's policies and keys, and return the token of the data to Alice. Alice will use the tokens returned from the queries to compare against her own records, and the token that matches her records will be used.

In another example, if Alice has records for Carol under the token "XYZ" and receives "ABC" from Bob, a client 150, via a direct communication (i.e., not via the policy broker 110), a query identifying Bob and containing "ABC" will be sent to the policy broker 110 to determine whether Bob sent Alice plaintext or his own token ($token_{Bob}$) for Carol's data. The tokens returned by the query may be, for example, "XYZ" for the tokenization according to Alice's policies and keys, and "QDO" for the detokenization and retokenization according to Bob's and Alice's policies and keys respectively. Because "XYZ" matches Alice's records, Alice will know to treat the particular direct communication from Bob as containing plaintext. As will be understood, the more data that Alice includes in the query, the less likely she is to receive false positive or multiple matching results in her records.

Figure 2B:
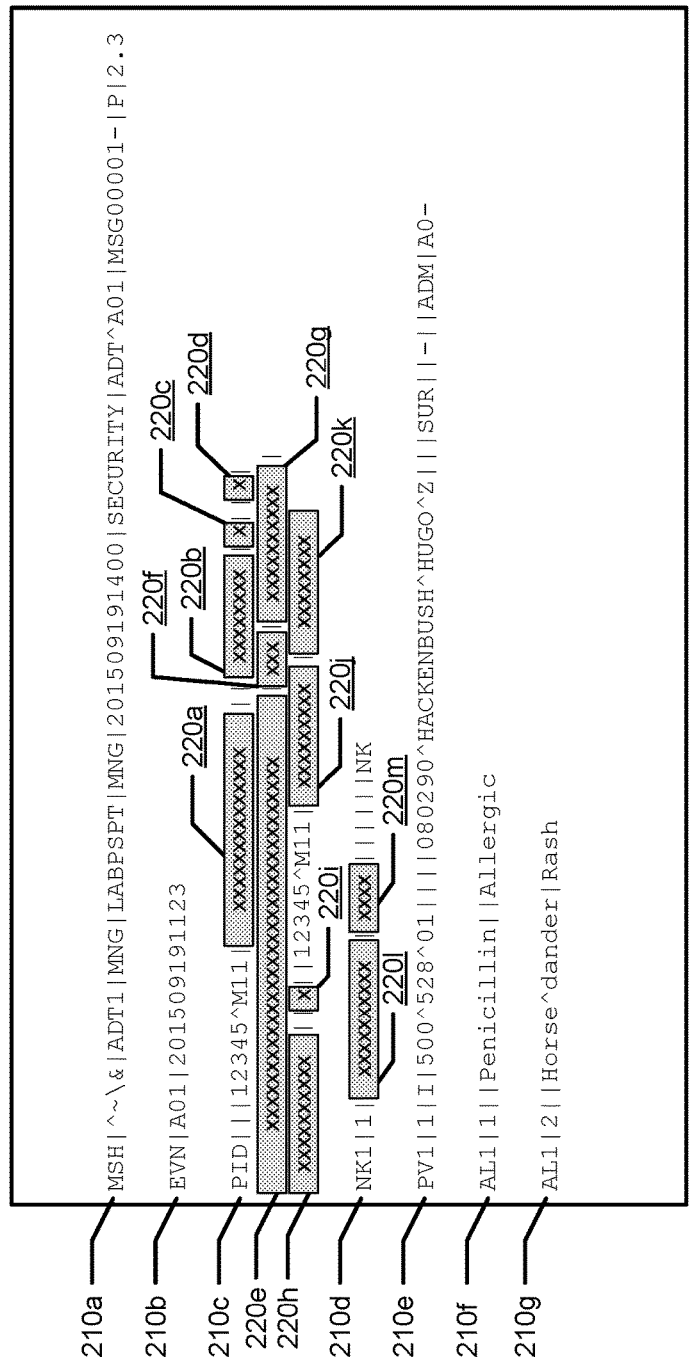

FIGS. 2A and 2B illustrate examples of an untokenized structured document layout 200 and a tokenized structured document layout 205. The illustrated examples comply with Health Level Seven (HL7) document formatting rules for healthcare shared healthcare documents, but as will be understood, other formats than HL7 for use in other industries than healthcare may make use of different structures to format their documents, for example, via an eXtensible Markup Language (XML), or Java Script Object Notation (JSON) format. In the illustrated example, seven data segments 210a-g (collectively, data segments 210) are displayed. Within each data segment 210 are several data fields, which contain various data related to the data segment 210. For example, when a first data segment 210a contains message header information, its data fields may contain a document type, a timestamp for time sent, encoding information, etc., whereas a third data segment 210c containing PII, may include subfields for, a patient's name, address, SSN, etc.

In the structured document layouts 200 and 205, data segments 210 are called out by tags, delineators, and/or positioning within the structured document. For example, in an HL7 document the tag "PID" is used to indicate that the following data is related to a patient's identification, whereas the tag "NK1" is used to indicate that the following data is related to a patient's next of kin (i.e., the patient's relatives or emergency contacts). In various aspects, tags may include a closing tag to indicate the end of the data segment 210 (e.g., End, </body>), or the data segment 210 may end at a predetermined length of data (e.g., after forty characters), at a line-end within the data, or at special character.

Within each data segment 210, the data may be further delineated into separate data fields by delineating characters, such as, for example, commas, semicolons, spaces, vertical lines (i.e., the "|" character), forward or back slashes, etc. In various aspects, tags may be used within tags to form nested data fields (e.g., <table><field>1</field><field>2</field></table>). In the illustrated example, the HL7 format uses vertical lines to delineate data fields within data segments 210.

As will be understood, null data fields may be present in the structured document so that a system is enabled to interpret the contents of data fields by their position within the data segment 210. For example, under HL7, the first subfield in the PID data segment 210*c* is for setting a patient identification, the second is for a patient identification from an outside party (e.g., a referring physician), and the third is for the internally used patient identification. As illustrated, the first two delineated data fields contain no data (i.e., are null), but the third data field contains "12345 M11", which, based on its position, may be interpreted as the internally used patient identification for the party who created this structured document.

As will be appreciated, when a character or set of characters is used to indicate the end of a segment of tagged data or data field (or the beginning of a new segment or field), those characters should be excluded from cipher B's codebook as potential outputs for a token. For example, when the structured document uses vertical line characters to delineate data fields, as illustrated in FIGS. 2A and 2B, the vertical line character should be excluded as a potential token character; no character encoded according to cipher B will be encrypted as the vertical line character. In various aspects, a message header section may include a listing of delineating and special characters for encoding that are read by the policy broker 110 and excluded from use in cipher B. For example, under the HL7 standard, the first character after the message header tag is interpreted as the delineator for data fields and the first data field contains up to four characters set as special encoding characters, which will be removed from the domain of potential characters for the codebook of cipher B.

Additionally, data fields may be further subdivided by additional encoding characters so that the policy broker 110 can provide domain-specific sub-tokens for the subfields. For example, when a data field contains the characters "120^OAK^ST^ANYTOWN^FR^12345-6789", as in the illustrated example, the caret character (i.e., "^") used to encode space characters may also be used as a subfield delineator to identify subfields within the data field. The subfields would thereby include the address number ("120"), street ("Oak St"), city ("Anytown"), state abbreviation ("FR"), and zip code ("12345-6789") as subfields. Each subfield can then be tokenized according to its own domain of characters (e.g., the address number a numeric, the city as alphabetic, etc.). When a data field is subdivided, the character used to subdivide the data field will not be tokenized. Conversely, that same character in a non-subdivided data field may be tokenized or passed though untokenized. For example, according to client policies for a first data field, the caret character subdivides the data field and is not tokenized. For a second data field, policies do not use the caret character to subdivide the data field, and any caret characters in that data field may be tokenized or remain unencoded in the token (i.e., be preserved as carets). As will be appreciated, subfields may be further divided ad infinitum under the same principles (e.g., the zip code field may be divided by the hyphen character).

FIG. 2B illustrates the tokenized structured document layout 205 of the untokenized structured document layout 200 presented in FIG. 2A. According to the policies of the client 150 receiving the tokenized structured document layout 205, the data fields containing PII have each been tokenized. Data segments 210 and data fields that are not indicated by the policies remain plaintext, as do tags and delineators, although in some aspects the policy enforcer 130 is operable to locate data to replace with a token that matches the data tokenized in an indicated data segment 210. Although illustrated as gray boxes containing a series of 'x' characters, the tokenized data fields 220*a-m* (collectively, tokenized data fields 220) represent data matching the length and domain of characters used in the untokenized data field. For example, the first tokenized data field 220*a* corresponds to the name of the patient, which may be a token of the same number of characters as the patient's name having an alphabetic domain, because the characters used in the subfield were only alphabetic characters. Further examples that provide greater detail of tokenization are presented in relation to FIG. 2C.

A domain, as used herein, is a list of characters that the plaintext characters belong to, from which ciphertext characters can be assigned by the tokenizer 140. Examples of domains include, but are not limited to: numeric (0-9), alphabetic (a-z, A-Z), punctuation (space, period, comma, etc.), special characters (ampersand, backslash, non-printing characters, etc.), non-English letters/characters (extended Latin characters (e.g., thorn ("Þ, þ"), eszett ("ß"), ligatures, accented characters), Greek letters, Cyrillic letters, Hangul, Chinese characters, hiragana, etc.), and combinations and divisions thereof (e.g., alpha-numeric, alpha-numeric with punctuation, alphabetic with Greek letters, lowercase alphabetic, punctuation excluding space). As will be understood, the radix of the domain corresponds to the number of characters in that domain. For example the numeric domain has a radix of ten, whereas the domain of capital English letters has a radix of twenty-six, because ten characters comprise the numerals of 0-9 and twenty-six comprise the letters A-Z. For a domain with a larger radix, a given plaintext character has a greater number of characters into which it may be encoded.

The domain of a data segment 210 or a data field may be determined by the tokenizer 140 reading the data segment 210 or data field and checking the various plaintext characters against the definition of a domain, or according the preferences set by the client 150 that note the domain of the data segment 210 or data field. As will be understood by those of ordinary skill in the art, different categories of characters may be specified based on ranges within a character mapping such as ASCII (American Standard Code for Information Interchange) or Unicode. In various aspects, delineators and other characters used to signal meaning within the format of the structured document are excluded from the domains. Additionally, space characters and punctuation characters (or their encodings) may be encrypted or remain unencrypted, and when they remain unencrypted, are excluded from the domain. For example, the token for the plaintext of "DOE^JOHN^Q^III" may be "YDK^NXWP^Z^OJD" when spaces are unencrypted and "UMPJ^GJLRPJSJD" when space characters are encrypted.

Figure 2C:
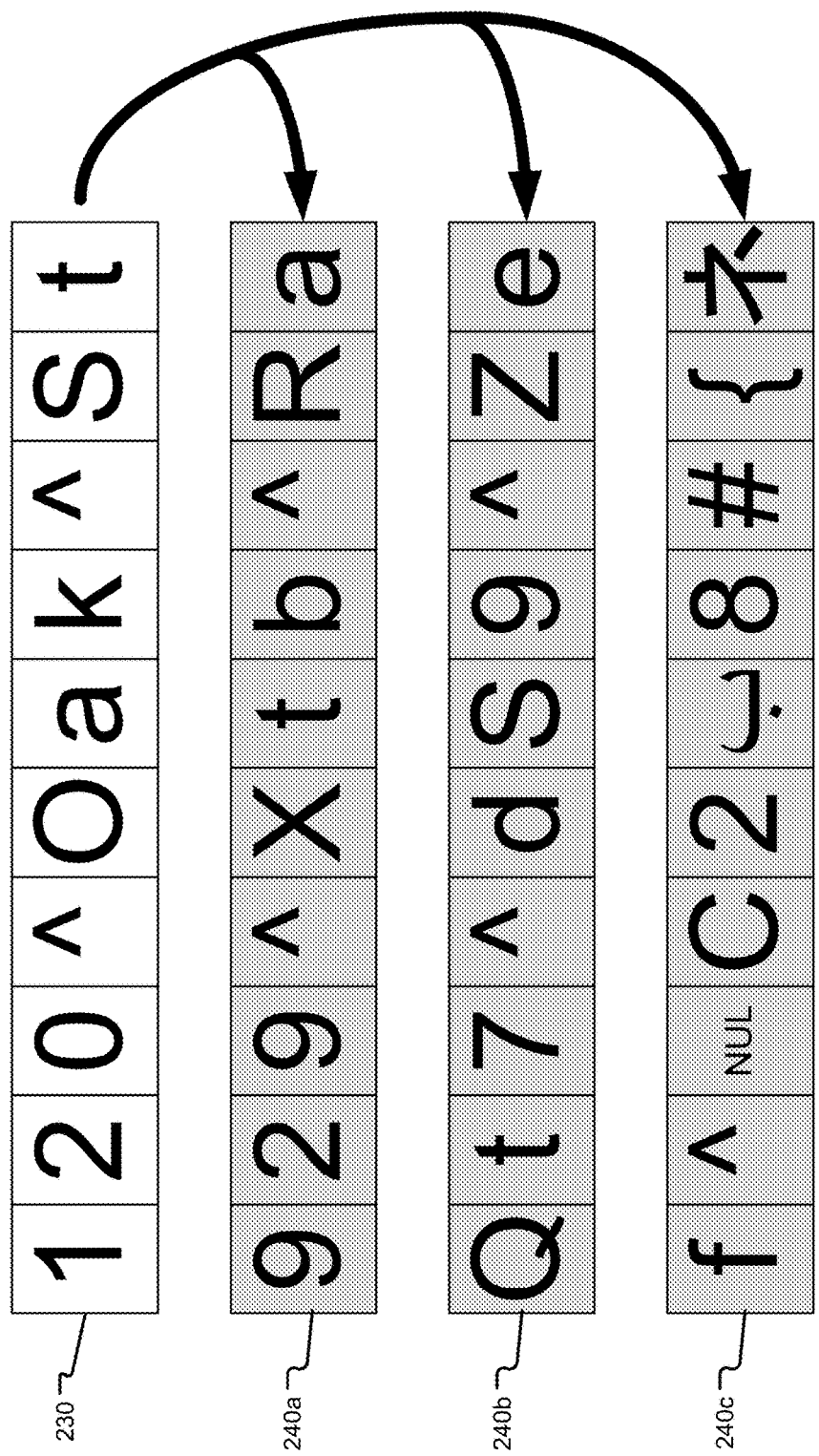
FIG. 2C illustrates various example tokens for a given example plaintext.

FIG. 2C illustrates various example tokens 240*a-c* (collectively, example tokens 240) for a given example plaintext 230. As will be recognized, each example token 240 contains the same number of characters as the example plaintext 230, but differs from the other example tokens 240 based on the policies set by the receiving party and the key for the receiving party. Each of the example tokens 240 may be detokenized by the tokenizer 140 back into the example plaintext 230.

The first example token 240a illustrates a character-based tokenization that retains the domain of each plaintext character for each corresponding tokenized character. The tokenizer 140 is operable to read each character as it is tokenized to determine its domain so that the tokenized character will retain the domain of its plaintext. Non-printing characters and special characters (such as spaces and/or punctuation) are ignored by the tokenizer 140 when reading the characters so that the token will retain the same shape as the plaintext. In the illustrated first example token 240a, the numeric portion of an address from the example plaintext remains numeric, the capital letters remain capital letters, the lower case letters remain lower case, and the special characters (e.g., space encodings) are not tokenized.

The second example token 240b illustrates a segment-based tokenization that retains the domain of the segment 210 in the token. Non-printing characters and special characters (such as spaces and/or punctuation) may be ignored or included by the tokenizer 140 when determining the domain of a segment 210. In the illustrated second example token 240b, the non-special characters are tokenized as characters from the domain of the segment 210. Because the domain is alphanumeric (as determined by policy or reading the segment 210), any of the plaintext characters may be tokenized as any alphanumeric character; numbers may be tokenized as letters, letters as number, etc.

The third example token 240c illustrates a policy-based tokenization that uses a domain specified by the receiving party's policy for the characters to be used in the token. In the illustrated example token 240c, each of the characters from the example plaintext 230 may be limited to any domain of characters regardless of their initial domain, and Non-printing characters and special characters (such as spaces and/or punctuation) may be ignored or included when tokenizing the plaintext according to the policy. As stated previously, the policy will exclude delineating characters from the domain from tokenization. The policy is based on the receiving party's system so that the characters received in the token will not violate any construction rules for that party's systems by being unsupported by that system.

Figure 3A:
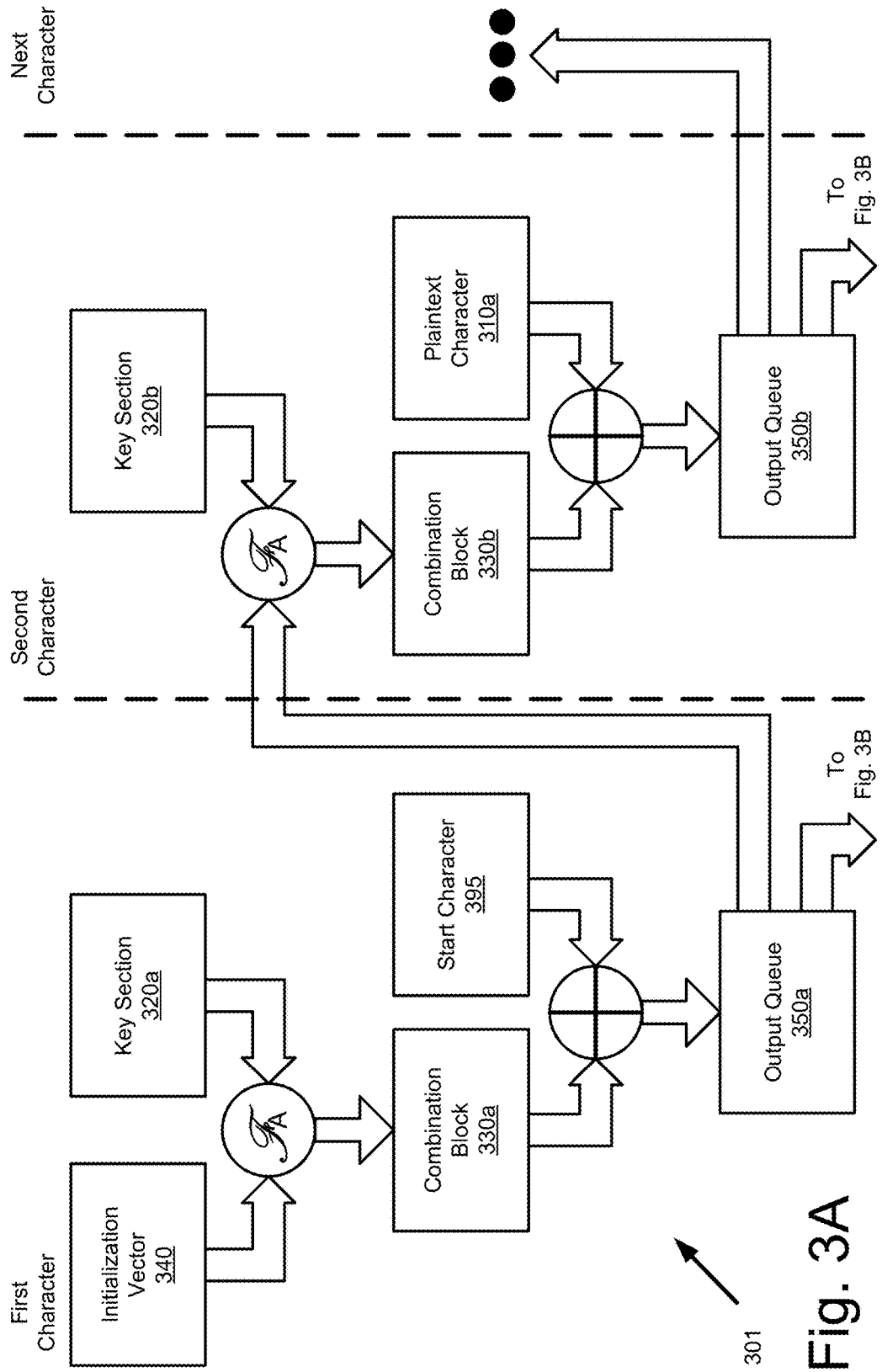
FIG. 3A is an example block diagram of the first step of tokenization, outlining cipher A's operation.
Figure 3B:
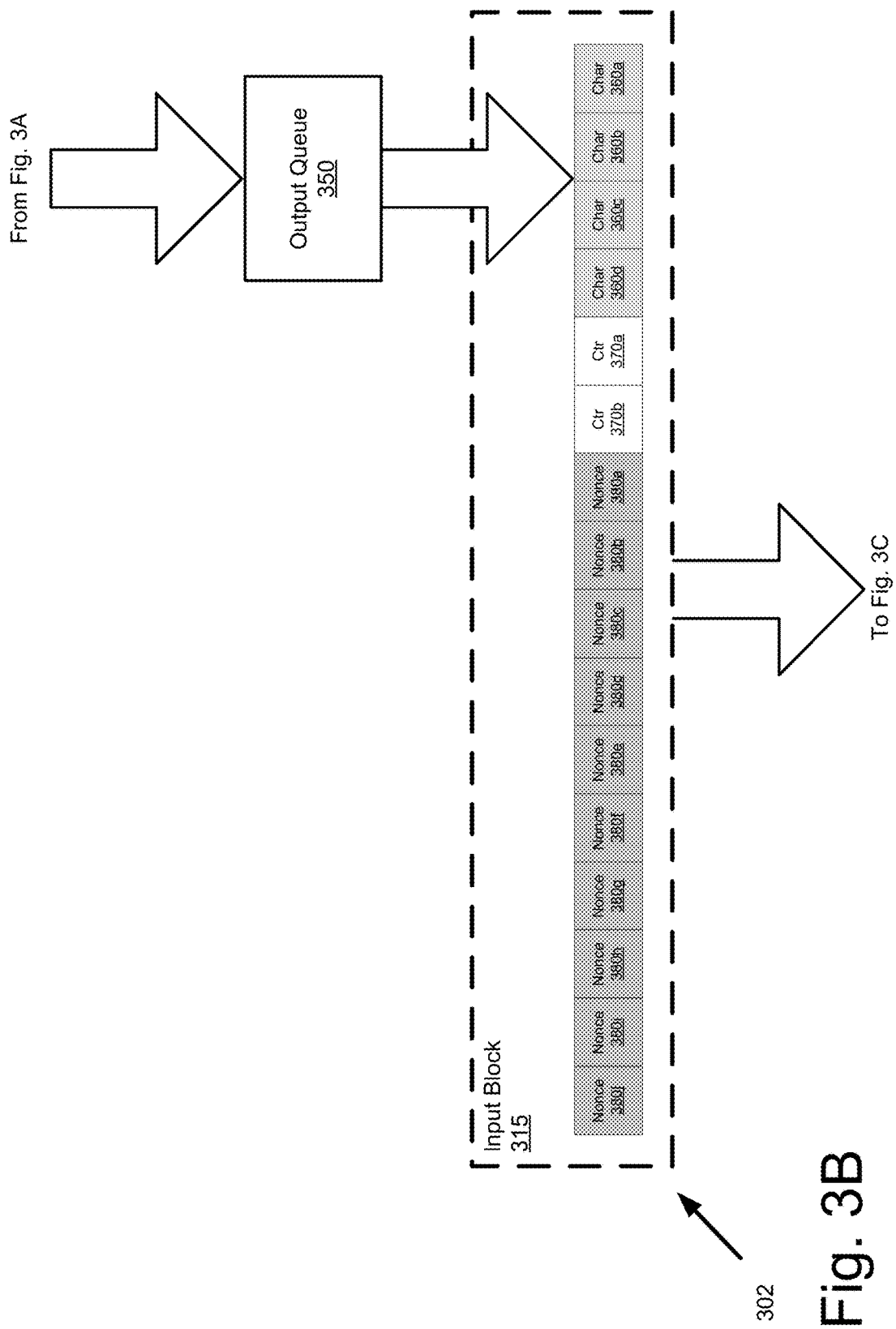
FIG. 3B is an example block diagram of the second step of tokenization, outlining the creation of the input block for cipher B.
Figure 3C:
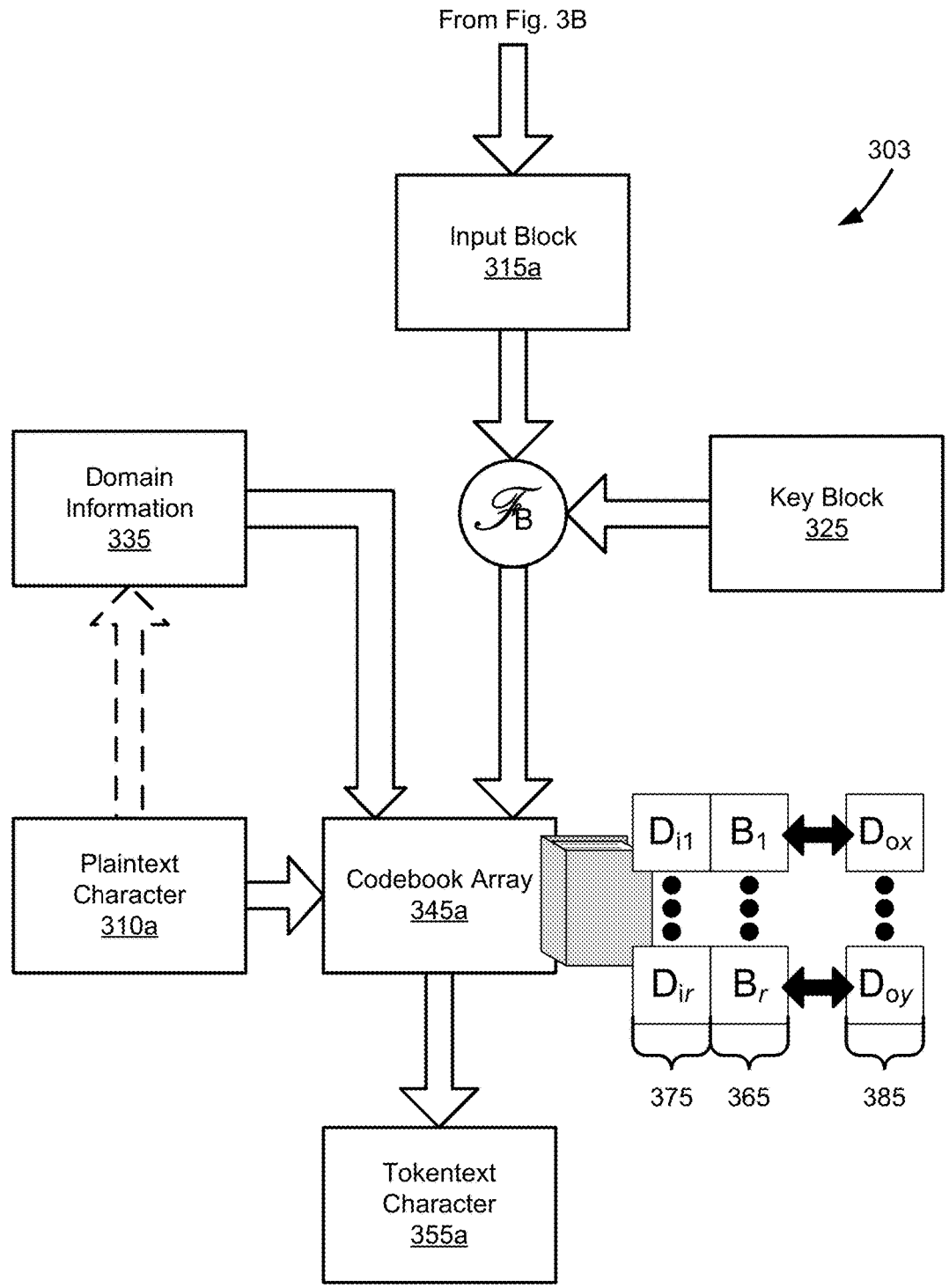
FIG. 3C is an example block diagram of the third step of tokenization, outlining the operation of cipher B.

FIGS. 3A, 3B, and 3C are block diagrams of data undergoing tokenization according to cipher A and cipher B. Tokenization is a multi-part encryption of data that preserves the format of the plaintext in the resulting tokentext. A first cipher, cipher A, is applied to the plaintext to create a stream of randomized data that are fed into a second cipher, cipher B, to randomize how cipher B behaves when creating tokens from plaintext to create a consistent output for a given receiver that is cryptographically secure.

As discussed herein, the combination of bytes, via their constituent bits, is a logical operation performed on the bits via logic gates. For example, each bit of each byte or block of bytes may be combined via a XOR logic gate implementing an "exclusive or" operation on two input bits. One of ordinary skill in the art will be familiar with alternative arrays of logic gates (e.g., AND, OR, NOT (also referred to as an inverter), XOR, NAND, NOR, and NXOR gates) that may provide the functionality of a XOR gate. As will also be known to one of ordinary skill in the art, straight combination of bits is not necessary; the combination of bits may be scrambled according to various functions. To illustrate the point, $byte_1$ and $byte_2$ each include eight bits, $bits_{1-8}$, and a given bit of $byte_1$ may be combined with any bit of $byte_2$ so long as each bit from each byte is only combined once with a bit from the other byte. For example, $bit_1$ of $byte_1$ may be XORed with $bit_1$ of $byte_2$, $bit_2$ with $bit_2$, $bit_3$ with $bit_3$, etc., in a straight combination of those bits. Alternatively, in an example scrambled combination, $bit_1$ of $byte_1$ may be XORed with $bit_6$ of $byte_2$, $byte_1$ $bit_2$ with $byte_2$ $bit_4$, $byte_1$ $bit_3$ with $byte_2$ $bit_3$, $byte_1$ $bit_4$ with $byte_2$ $bit_7$, $byte_1$ $bit_5$ with $byte_2$ $bit_1$, $byte_1$ $bit_6$ with $byte_2$ $bit_2$, $byte_1$ $bit_7$ with $byte_2$ bits, and $byte_1$ bits with $byte_2$ $bit_5$. One of skill in the art will recognize that there are several ways to scramble bits and bytes and that the above is but one example.

The ciphers discussed herein may be performed with characters encoded as a single byte or in multiple bytes. For example, when plaintext is encoded according to one of the Unicode Transformation Formats (UTF), such as, UTF-8, UTF-32, or similar standards that can use more than one byte to encode characters, the ciphers may be adapted to perform their operations with multiple bytes. Although some of the examples given herein are framed in terms of single-byte encodings for characters, one of ordinary skill in the art will be enabled to apply the present disclosure with multi-byte encodings for characters.

FIG. 3A is an example block diagram of the first step 301 of tokenization, outlining cipher A's operation. Cipher A operates in cipher feedback (CFB) mode, which uses the results of a previous encryption to further randomize the results of cipher A for subsequent encryptions. The resulting output queue 350, or a portion thereof, for a given plaintext character 310 will be fed into the input block 315 used for cipher B to build a prefix-based codebook.

Because there is no output queue 350 from previous encryptions available for tokenizing a first plaintext character 310a, an initialization vector 340 is used instead, which is unique to the receiving client 150. The size of the initialization vector 340 is determined by the function used to encrypt the plaintext in cipher A. Similarly, the output queue 350 also matches the block size of the function used in cipher A. For example, when a 128-bit (i.e., sixteen byte) block cipher is used in cipher A, the initialization vector 340 and output queue 350 will also be sixteen bytes in size. In contrast, when an 8-bit (i.e., one byte) block cipher is used in cipher A, the initialization vector 340 and output queue 350 will be one byte in size. By using the same initialization vector 340 over multiple encryptions, a given plaintext can be encrypted to produce a consistent token. Therefore, in various aspects, the initialization vector 340 is reused at the start of each message or data segment 210 of that message during tokenization. The initialization vector 340 is kept privately by the policy broker 110, and is not shared with any of the parties, including the party for whom it is stored.

A start character 395 is also used for tokenizing the first plaintext character 310a instead of feeding the first plaintext character 310a into cipher A for the initial tokenization. By using a known start character 395, detokenization can follow the same process in cipher A to result in a consistent electronic codebook of cipher B for tokenization and detokenization. The start character 395 may be a character known only to the FPE system 100 and reused between clients 150, or it may be a random character that is selected differently for each client 150. The start character 395 is held privately by the FPE system 100, and is not shared with any outside parties, and it is reused consistently for a given client 150; messages being transmitted to a given client 150 will always use the same start character 395 for a given data segment 210 or data field. The start character 395 is sized according to the encoding format of the plaintext, and may be of any value, including unassigned encodings, non-printing characters, and special characters. For example, when the encoding format of the plaintext is UTF-32, the value of the start character 395 may be any value between $00000000_{x16}$ and $FFFFFFFF_{x16}$ and occupy four bytes, while if the encoding format of the plaintext is UTF-8, the start character may be any value between $00000000_{x16}$ and $FFFFFFFF_{x16}$ and occupy one to four bytes (e.g., $00_{x16}$ instead of $00000000_{x16}$).

Each receiving client 150 has a unique key by which plaintext transmitted to it will be encrypted. Keys are kept privately for each client 150 by the policy broker 110, and are not shared with any of the parties, including the party for whom it is stored.

Because cipher A operates in CFB mode, the plaintext character 310 may be smaller than or the same size as the key section 320, initialization vector 340, and output queue 350, which are sized according to the block size of the function used in cipher A. In various aspects, the size of the plaintext character 310 may vary as tokenization progresses. For example, a first plaintext character 310a may be encoded by one byte (e.g., the UTF-8 encoding of the character "a" as $61_{x16}$), while a second plaintext character 310b (not illustrated) may be encoded by multiple bytes (e.g., the UTF-8 encoding of the character "ä" as $C3A4_{x16}$). In other aspects, the size of the plaintext character 310 may remain constant, such as for, example, at one byte, two bytes, or four bytes.

In aspects where a variable-byte format (e.g., UTF-8) is used to encode the plaintext characters 310, the first step of tokenization may include converting the plaintext characters 310. For example, the plaintext characters 310 may be converted to a fixed-byte format (e.g., UTF-16) for tokenization. In another example, the domain for the characters may be compressed; shifting the encoding values for characters in the domain so that characters that are used (or available for use) replace characters that are not used (or are unavailable for use). To illustrate, consider the UTF-8 characters of the capital English vowels (A, E, I, O, U, and Y), which are each encoded in one byte (as $41_{x16}$, $45_{x16}$, $49_{x16}$, $4F_{x16}$, $55_{x16}$, and $59_{x16}$ respectively) and the extended Latin capital vowels (e.g., À, Á, Â, Ã, Ä, Å, È, É, Ê, Ë, Ì, Í, Î, Ò, Ó, Ô, Õ, Ö, Ø, Ù, Ú, Û, Ü, Ý), which are encoded with two bytes (e.g., $C380_{x16}$, $C381_{x16}$, etc.). If a domain for the capital vowels were defined to include both the capital English vowels and the extended Latin capital vowels, the encoding values for the extended Latin capital vowels may be shifted into a portion of the encoding space represented by one byte that is not used by the existing characters. For example, because the encoding space of one byte includes up to 255 different values, and there are only thirty-one characters in the defined domain of capital vowels, each of the encodings may be reindexed to be encoded by one byte for tokenization (e.g., for purposes of tokenization A is reindexed from $41_{x16}$ to $00_{x16}$, À is reindexed from $C380_{x16}$ to $01_{x16}$, Á is reindexed from $C381_{x16}$ to $02_{x16}$, etc.) Reindexing may also be used to provide a continuous set of encoding values; shifting non-continuous character encodings into a continuous block. For example, the capital English vowels are non-continuous, as there are gaps between at least some of the encoding values (e.g., $41_{x16}$ and $45_{x16}$, encoding for A and E respectively, have a gap of three encoding values, representing the characters B, C, and D), but may be reindexed to form a continuous block of values for manipulation and reference during tokenization. As will be appreciated, after tokenization, the original encodings (e.g., UTF-8) for the characters will be used for transmission to the receiving party.

To tokenize the first plaintext character 310a, the initialization vector 340 is combined with a first key section 320a according to a selected encryption function of cipher A to produce the contents of the first combination block 330a. In various aspects, the initialization vector 340 and the first key section 320a are encrypted together according to various block ciphers, including, but not limited to: AES, DES, Lucifer, LOKI, or Madryga, which will shift and combine the input bits and bytes to produce the combination blocks 330. One of ordinary skill in the art will be familiar with the operation of these ciphers, so their operation will not be discussed in depth in the present disclosure so as not to distract from the present disclosure's inventive concepts.

The first combination block 330a is then combined with the start character 395, for example, via a XOR operation. When the plaintext character 310 or start character 395 is the same size as the combination block 330, each byte is combined to produce the output queue 350, which will be used in the next iteration of cipher A to tokenize the second plaintext character 310b. When the plaintext character 310 (or start character 395) is smaller than the combination block 330, a number of bits from the combination block 330 equal to the number of bits comprising the plaintext character 310 are combined with the bits of the plaintext character 310, the uncombined bits from the combination block 330 are shifted by the number of bits combined (the shift direction may vary in different aspects) and the combined bits are inserted where the uncombined bits originated from. To illustrate, consider a two-byte combination block 330 of 0000 0000 1111 $1111_{x2}$ and a one-byte plaintext character 310 of 0101 $0101_{x2}$. Because the plaintext character 310 is eight bits (one byte) in size and smaller than the combination block 330, eight bits from the combination block 330 will be selected and combined with the plaintext character 310, for example the eight most significant bits, which encode 0000 $0000_{x2}$ in the example, via a XOR operation to produce the encoding of 0101 $0101_{x2}$. The unused bits of the combination block 330, which encode 1111 $1111_{x2}$ in this example, are then shifted eight bits to the left to fill the position of the used bits, and the combined bits are inserted into the positions vacated by the shifted bits to produce the output queue 350 of 1111 1111 0101 $0101_{x2}$. As will be understood, if the least significant bits from the combination block 330 (i.e., those encoding 1111 $1111_{x2}$ in the example) were selected instead for combination with the plaintext character 310, the most significant bits would be shifted eight bits to the right, and the combined encoding would be inserted into the most significant positions.

To tokenize the second plaintext character 310b, the first output queue 350a is combined with the second key section 320b to produce a second combination block 330b. The second combination block 330b is then combined with the first plaintext character 310a to produce the second output queue 350b. This process will continue, using the previous output queue 350 to combine with a key section 320 to produce the next combination block 330 to result in the next output queue 350 when combined with the next plaintext character 310, until all of the plaintext has been encrypted.

When data are detokenized, cipher A operates the same as when data are tokenized. Each plaintext character 310 detokenized from a tokentext character 355 is fed back into cipher A to vary the inputs the cipher B receives.

FIG. 3B is an example block diagram of the second step 302 of tokenization, outlining the creation of the input block 315 for cipher B. The operation of the second step 302 is the same for tokenization and detokenization; data from the output queue 350 produced by cipher A is concatenated with a counter and a nonce to assemble an input block 315 to be fed into cipher B as its input. Although examples are given herein in terms of plaintext for tokenization, it is to be understood that the examples are equally applicable for detokenization by substituting term "tokentext" for the term "plaintext" in the examples.

The input block 315 is sized according to the block size of the function used in cipher B. Although the example illustrates a sixteen-byte input block 315 for use with a sixteen-byte block cipher, one of ordinary skill in the art will be enabled to use the present disclosure with input blocks 315 configured for block ciphers with different block sizes with different allotments of the constituent bytes outlined below. As illustrated, the input block 315 is sixteen bytes in size, of which four are allotted as character bytes 360a-d (collectively, character bytes 360), two are allotted as counter bytes 370a-b (collectively, counter bytes 370), and ten are allotted as nonce bytes 380a-j (collectively, nonce bytes 380).

After a plaintext character 310 (or the start character 395) has been encrypted by cipher A and placed into the output queue 350, the input block 315 is built. To construct the input block 315, the output of cipher A for a given plaintext character 310 is taken from the output queue 350, and inserted into one or more character bytes 360, which are bytes in the input block 315 reserved for the encrypted plaintext characters 310 from cipher A. In the illustrated input block 315, four character bytes 360a-d are reserved, although more or fewer bytes of the input block 315 may be allotted for character bytes 360 in other aspects. The assignment of encrypted character encodings to the character bytes 360 is done in a rotating cycle, such that the first character byte 360a is filled before a second character byte 360b, which is filled before a third character byte 360c, etc., and when a last character byte 360 is filled, the first character byte 360a will be the next character byte 360 filled. This cycle will repeat as the output queue 350 from cipher A is updated to tokenize each character until the message, the data segment 210, or data field to be tokenized has been fully tokenized.

A counter is also encoded into the input block 315. In one aspect, the counter will be incremented R times each time a character is encoded into the input block 315, where R is equal to the radix of the plaintext. By incrementing the counter R times, R distinct inputs are provided to cipher B for each plaintext character 310 so that cipher B will be run R times to provide one output each time. In another aspect, the counter will be incremented once per character encoded into the input block 315 and cipher B will be run once, but R outputs will be taken from cipher B. The outputs from cipher B are used to build a codebook array 345 having R entries, which is discussed in further detail in respect to FIG. 3C.

In the illustrated input block 315, two counter bytes 370a-b are reserved to encode the counter, although more or fewer bytes of the input block 315 may be allotted for counter bytes 370 in other aspects. As will be understood, the maximum number of incrementations that can be tracked by a single byte is 256, therefore by increasing the number of bytes in the input block 315 that are allotted for counter bytes 370, the counter may progress for a longer run without repeating. Although two counter bytes 370 are illustrated, one of skill in the art will recognize that a different number of bytes to encode the counter may be reserved in the input block 315 at the expense of bytes allotted for the nonce or the characters.

In various aspects, the counter will be incremented once for each time that the cryptographic function of cipher B is to be run. Although the counter may increment by one each time it is incremented, other step sizes of incrementation (e.g., two, three) or other patterns (e.g., increment by the next digit of pi, increment by the Fibonacci sequence, a cryptographically secure sequence of random numbers associated with the client 150) are possible. In various aspects, the counter will be incremented by zero or omitted, and therefore the counter bytes 370, may remain constant or be omitted from the construction of the input block 315.

A nonce is a value used during tokenization to meet the size requirements of the input block 315 while adding additional security to the encryption. In various aspects the nonce may be a random number, generated by a cryptographically secure random number generator, that is unique to the receiving client 150, an encoding of a data field identifier, or a known pattern of bits used to pad the input block 315 to the requisite number of bytes for cipher B. For example, the nonce for the data field for a name may be an encoding of "name" plus any additional bits (set to one or zero) needed to fill ten bytes, whereas the nonce for the data field for an address may be an encoding of "address" plus any additional bits (set to one or zero) needed to fill ten bytes. In another example, the nonce may be a random stream of bits unique to the receiving party that is used in addition to the key to provide uniqueness to the resulting token between clients 150. The nonce does not change while encrypting a given data field.

To illustrate the construction of an input block 315, consider the following TABLE 1, which illustrates the values for the various bytes of a sixteen-byte input block 315 as it is built for encrypting a series of plaintext characters 310. The first plaintext character 310a to be encoded was encrypted as $0110\ 0001_{x2}$ in one byte by cipher A, and is placed in the first character byte 360a, which is shown in TABLE 1 as $byte_0$. The initial value for the counter is zero, which is encoded into the counter bytes 370, which are shown in TABLE 1 as $byte_4$ and $byte_5$. Next, the nonce is concatenated with the counter bytes 370 and character bytes 360 to form $bytes_{6-15}$ of the input block 315, and the input block 315 may now be used by cipher B. The counter will increment R times so that R input blocks 315 are provided to cipher B for a given plaintext character 310. For example, for a radix of fifty-two, corresponding to an alphabetic domain of the English alphabet, fifty-two input blocks 315 will be provided to cipher B, each with a different counter value.

When the next plaintext character 310 is to be encoded, the input block 315 is updated. In the example given in TABLE 1, cipher A has output a two-byte encryption of $1100\ 0100\ 1000\ 0001_{x2}$ for the second plaintext character 310b, which is encoded in the second character byte 360b and the third character byte 360c. The counter bytes 370 are updated to reflect the current counter state, while the nonce remains the same. If, however, the first plaintext character 310a and the second plaintext character 310b are from different data segments 210 or data fields, and the client has policies indicating that different nonce values are to be used in different data segments 210 and data fields, the nonce value will be changed accordingly.

In the current example in TABLE 1, the current counter state has been incremented fifty-two times by the time the second plaintext character 310b is ready to be encoded, because the domain for the first plaintext character 310a had a radix of fifty-two (the set of A-Z and a-z). In aspects where R input blocks 315 are provided to cipher B for a given plaintext character 310, the counter increments R times for each character. For example, for a radix of fifty-two, corresponding to an alphabetic domain of the English alphabet, fifty-two input blocks 315 will be provided to cipher B, each with a different counter value. In aspects where one input block 315 is provided to cipher B (not illustrated in TABLE 1), the counter increments one time for each character.

TABLE 1

Example Subsequent Input Block Construction

| Byte | Allotment | 1st Plaintext | 2nd Plaintext |
| --- | --- | --- | --- |
| 0 | Character | $0110\ 0001_{x2}$ | $0110\ 0001_{x2}$ |
| 1 | Character | $0000\ 0000_{x2}$ | $1000\ 0001_{x2}$ |
| 2 | Character | $0000\ 0000_{x2}$ | $1100\ 0100_{x2}$ |
| 3 | Character | $0000\ 0000_{x2}$ | $0000\ 0000_{x2}$ |
| 4 | Counter | $0000\ 0000_{x2}$ | $0011\ 0100_{x2}$ |
| 5 | Counter | $0000\ 0000_{x2}$ | $0000\ 0000_{x2}$ |
| 6 | Nonce | $0110\ 1010_{x2}$ | $0110\ 1010_{x2}$ |
| 7 | Nonce | $1000\ 0010_{x2}$ | $1000\ 0010_{x2}$ |
| 8 | Nonce | $1111\ 0100_{x2}$ | $1111\ 0100_{x2}$ |
| 9 | Nonce | $1100\ 0111_{x2}$ | $1100\ 0111_{x2}$ |
| 10 | Nonce | $0100\ 1100_{x2}$ | $0100\ 1100_{x2}$ |
| 11 | Nonce | $0110\ 0101_{x2}$ | $0110\ 0101_{x2}$ |
| 12 | Nonce | $1001\ 0110_{x2}$ | $1001\ 0110_{x2}$ |
| 13 | Nonce | $0100\ 1000_{x2}$ | $0100\ 1000_{x2}$ |
| 14 | Nonce | $0011\ 0010_{x2}$ | $0011\ 0010_{x2}$ |
| 15 | Nonce | $1100\ 0000_{x2}$ | $1100\ 0000_{x2}$ |

FIG. 3C is an example block diagram of the third step 303 of tokenization, outlining the operation of cipher B. The encryption function used in cipher B may be chosen from AES, DES, Lucifer, LOKI, Madryga or another block cipher capable of operating in electronic codebook (ECB) mode. Cipher B operates in ECB mode to produce a codebook array 345 unique to a given input block 315 and key block 325 for the given domain information 335 of the plaintext, and thereby unique to the character from the message being tokenized. Although the exact encryption function used in cipher B may vary in different embodiments, the function will be a block cipher using ECB mode followed by a prefix weighting to assign plaintext to tokentext within the specified domain. One of ordinary skill in the art will be enabled from the present disclosure to make the necessary modifications to use different functions with the inputs discussed to produce a tokentext that preserves the format of a given plaintext.

Because Cipher B operates in ECB mode, a given input block 315, for a given key block 325 and domain information 335, will always result in the same tokentext character 355 being output when the same plaintext character 310 is input. Cipher B works on a per-character basis, such that a first plaintext character 310a will produce a first tokentext character 355a (generally, tokentext characters 355) when a first input block 315a is fed into its cryptographic function. Cipher B is reversible so that a given character in a given position in a message will always be able to transform back and forth to the same plaintext character 310 or tokentext character 355.

The constant updating of the input block 315 as each plaintext character 310 (or tokentext character 355) is tokenized (or detokenized) serves to strengthen the cryptographic strength of the tokens produced by ciphers A and B. For example, when a first plaintext character 310a of the letter "a" is tokenized, the corresponding first tokentext character 355a may be the letter "b". In a simple codebook encryption, all of the letters "a" in the plaintext would be encrypted as the letter "b", and all of the letters "b" can be decrypted back to the letter "a". In tokenization, however, subsequent plaintext characters 310 of the letter "a" may be encrypted as any character within the indicated domain of characters (which may include subsequent encryptions as the letter "b"). For example, the plaintext of "aaaaa" may result in the token of "bdatb", which preserves the format of the plaintext and is cryptographically strong by being more resistant to frequency analysis than a simple codebook encryption.

The chosen encryption function is initialized by a key block 325, which in various aspects may be the same value as the key used in cipher A, but in other aspects, the key block 325 has a different value of random numbers from the key used in cipher A. The key block 325 is sized according to the block size of the encryption function chosen for use in cipher B, and is associated uniquely with a given client 150. Key blocks 325 are kept privately for each client 150 by the policy broker 110, and are not shared with any of the parties, including the party for whom it is stored.

The input block(s) 315 for the given character being tokenized is fed into the initialized encryption function to produce a codebook according to the encryption function. As will be understood, a block cipher operating in ECB mode produces as its output several values that comprise a codebook, wherein the number of entries in the codebook is equal to two raised to the number of bits in the block (i.e., $2^{[8*block\ size]}$). For example, a block cipher having a sixteen-byte block would return a codebook with $2^{128}$ entries, while a block cipher having an eight-byte block size would return a codebook with $2^{64}$ entries.

The codebook from cipher B is used to produce a codebook array 345 having a number of entries equal to the radix of the plaintext's character domain. The entries are each constructed from an entry value 365 (selected from the codebook) that is then associated with an input domain character 375 and an output domain character 385 that are paired with the entry value 365 based on a prefix weighting of the entry values 365 to the characters that comprise the domain of the plaintext. In various aspects, the entry values 365 from the codebook may be selected from one run or from multiple runs of the encryption function used in cipher B, which will affect how many input blocks 315 are used to encode a single plaintext character 310. For example, when one input block 315 is used for encoding a plaintext character 310 with a domain radix of R, the first through Rth entry values 365 will be selected from the codebook produced in one run of the encryption function used in cipher B. In another example, where R input blocks 315 (with different values for their counter bytes 370) are input to cipher B for tokenizing a given plaintext character 310, the first entry value 365 from each of the R runs will be selected. As will be appreciated, other selections may be made from the output of the encryption function than those discussed in the above examples. For example the nth through [R+n]th entry values 365, or R selections of the nth entry value 365, or R selections of entry values 365 from multiple positions from one or more runs.

These entry values 365 are organized into a codebook array 345 by assigning an input domain character 375 and output domain character 385 to each entry value 365. Which characters comprise the input domain characters 375 and output domain characters 385 is set according to the domain information 335. The domain information 335 specifies the size of the domain (i.e., its radix) for the plaintext and the encoding values for the domain in the character format used for the receiving party. In various aspects, the domain information 335 may be provided by a policy set by the receiving client 150, by a reading of the data segment 210, data field, or subfield being tokenized/detokenized, or the given plaintext character 310 (or tokentext character 355) being tokenized (or detokenized). The encoding values define what values are used in the encoding format to encode characters within a given domain. For example, under UTF-8, the encoding values for numeric characters (i.e., 0-9) span the encoding values of $0011\ 0000_{x2}$ (starting value) to $0011\ 1001_{x2}$ (ending value). When a domain includes a break in encoding values (e.g., such as the domain of characters for 0-9 and A-Z under UTF-8, which excludes seven special character encoded from $0011\ 1001_{x2}$ to $0011\ 1111_{x2}$) then the encoding values corresponding to the break in the domain will be excluded. As will be appreciated, multiple breaks in encoding schemes may be handled in this manner.

The input domain characters 375 and output domain characters 385 are assigned to the entry values 365 based on a prefix weighting. Each input domain character 375 is assigned to an entry value 365 based on the order of the input domain characters 375 in the domain (i.e., an index of the domain) and the order of production for the entry values 365 (i.e., an index of the entry values 365). Although the index of the entry values 365 is based on the order in which they were produced, the index of the domain may be based on the values by which the domain is encoded, shifted to account for any missing characters from the encoding scheme in the domain. For example, the domain of English letters (i.e., A-Z and a-z) in UTF-8 occupies the encodings of $41_{x16}$ to $5A_{x16}$ and $61_{x16}$ to $7A_{x16}$; missing the encodings from $5B_{x16}$ to $60_{x16}$, which correspond to various the special characters "[", "\", "]", "^", "_", and "`". In this example, character "A" has the lowest encoding value ($41_{x16}$) and would be first in the index, character "B" would be next in the index, etc. Character "a", having the next highest encoding value ($7A_{x16}$) after character "Z" ($5A_{x16}$), despite the gap in encoding values, would be indexed after character "Z" for the index of the domain.

Regardless of whether cipher B was run once to return R entry values 365 or run R times to produce one entry value 365 each run, each input domain character 375 is assigned to a single entry value 365 so that there is a one-to-one correlation of input domain characters 375 to entry values 365. For example, for the lowercase English alphabetical domain of a-z, the input domain character 375 for "a" will be assigned to the first entry value 365 produced, the input domain character 375 for "b" will be assigned to the second entry value 365 produced, etc., until all of the input domain characters 375 are associated with an entry value 365. As will be appreciated, due to the nature of random numbers, when the encryption function of cipher B is run R times, there is a small chance that a given entry value 365 will be produced more than once. If this occurs, the encryption function will be run again to produce a new, unique entry value 365 to replace the identical entry value 365 or a tie-breaker function will be applied to ensure that no two entry values 365 are identical. TABLE 2 details an example assignment of the domain for the capital English vowels (having the order of: A, E, I, O, U, Y) assigned to the output of a 64-bit block cipher as entry values 365.

TABLE 2

Example Assignment of Input Domain Characters to Entry Values

| Index | Input Domain | Entry Value |
|---|---|---|
| 1 | A | $2EF841792C35B932_{X16}$ |
| 2 | E | $471B1AB2D7833F61_{x16}$ |
| 3 | I | $C71E0F00DFB9846C_{x16}$ |
| 4 | O | $E908628231F0E117_{x16}$ |
| 5 | U | $CE7D7B5A146FF298_{x16}$ |
| 6 | Y | $40B84DA871F23B5B_{x16}$ |

To correlate the output domain characters 385 to the input domain characters 375 in the prefix weighting, the output domain characters 385 are assigned to the entry values 365 based on the relative value of each of the entry values 365 and the index of the output domain characters 385. An example of this assignment is detailed in TABLE 3, using the same domain and entry values 365 from TABLE 2. In TABLE 3, the relative value of each entry value 365 in the codebook array 345 is shown as its weight, with the largest entry value 365 being given the highest weight and the smallest entry value 365 being given the lowest weight. Much like how the input domain characters 375 were assigned to entry values 365 based on the order of the input domain character 375 in its domain compared to the order in which the entry values 365 were produced, the output domain characters 385 are assigned to the entry values 365 based on their index compared to the weight of the entry values 365. For example, for the lowercase English alphabetical domain of a-z, the output domain character 385 for "a" will be assigned to the entry value 365 having the weight of one, the output domain character 385 for "b" will be assigned to the entry value 365 having a weight of two, etc., until all of the output domain characters 385 are associated with an entry value 365.

TABLE 3

Example Weighted Assignment of Output Entry to Output Domain Characters

| Input Domain | Entry Value | Weight | Output Domain |
|---|---|---|---|
| A | $2EF841792C35B932_{X16}$ | 1 | A |
| E | $471B1AB2D7833F61_{x16}$ | 3 | I |
| I | $C71E0F00DFB9846C_{x16}$ | 4 | O |
| O | $E908628231F0E117_{x16}$ | 6 | Y |
| U | $CE7D7B5A146FF298_{x16}$ | 5 | U |
| Y | $40B84DA871F23B5B_{x16}$ | 2 | E |

In alternative aspects, assignments may be done differently, such as largest entry value 365 to earliest domain character, and may be done with various offsets. For example, when the values shown in TABLE 3 are assigned largest to largest, but with an offset of one, each of the weights will be increased by one (with a modulus of the domain size) before output domain characters 385 are assigned, resulting in an Output Domain column, reading from top to bottom, of: E, O, U, A, Y, I. In another example, when the values shown in TABLE 3 are assigned largest to smallest without an offset (i.e., with an offset of zero), the Output Domain column would read from top to bottom: Y, O, I, A, E, U. As will be understood, other variations of assignment also exist, and those shown here are for purposes of illustration and do not limit the present disclosure.

As will be appreciated, for a given character being tokenized, the codebook array 345 for that character may specify that the given plaintext character 310 is converted to an identical tokentext character 355 (and vice versa). For example, as is shown in TABLE 3, the codebook array 345 for the first plaintext character 310a may tokenize "A" as "A"; specifying that if the first plaintext character 310a is the character "A", that the first tokentext character 355a will also be "A". One of ordinary skill in the art will recognize that this possibility is a feature that adds to the cryptographic security of tokenization.

Each input domain character 375 is associated in the codebook array 345 with the one output domain character 385 corresponding to the same entry value 365 from cryptographic function B. From the example in TABLE 3, the input domain character 375 of "A" would be associated with the output domain character 385 of "A", the input domain character 375 of "E" would be associated with the output domain character 385 of "I", etc. In various aspects, the plaintext character 310 is compared to the input domain characters 375 to produce the associated output domain character 385 from the codebook array 345 as the tokentext character 355. In other aspects, the plaintext character 310 is compared to the output domain characters 385 to produce the associated input domain character 375 as the tokentext character 355. As will be appreciated, during detokenization, the opposite order of comparison in the codebook array 345 is used from the order used during tokenization. Alternatively, the codebook array 345 may be generated in reverse order of input domain character 375 and output domain characters 385 for tokenization and detokenization and the order of comparison to the codebook array will remain the same.

Once the first plaintext character 310a has been compared via the codebook array 345 to produce the first tokentext character 355a (or vice versa), the codebook array 345 is discarded. Each plaintext character 310 being tokenized (or tokentext character 355 being detokenized) will use a separately generated codebook array 345. Because each of the codebook arrays 345 uses input blocks 315 that are different from the previous input blocks 315 used to build previous codebook arrays 345, repeated characters in the plaintext may be tokenized as different tokentext, and different characters in the plaintext may be tokenized as the same tokentext; increasing the security of the tokens, while providing consistent tokens that preserve the format of the plaintext.

As each character is converted (from plaintext to tokentext or from tokentext to plaintext) it is concatenated with the previously converted character to form the token (when being tokenized) or reform the plaintext (when being detokenized). The token will replace the plaintext (or vice versa) within the data field from which it was received in the message.

Figure 4A:
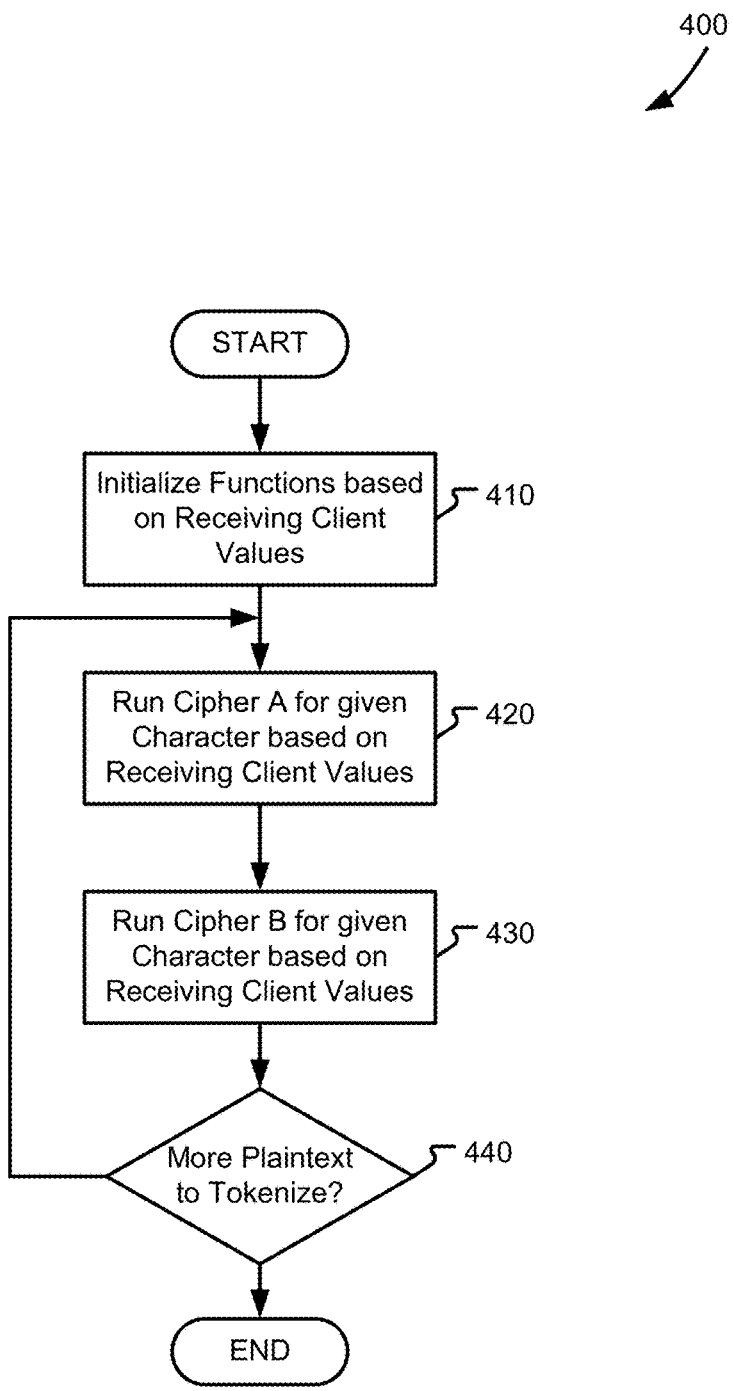
FIG. 4A is a flow chart illustrating general stages in an example method for tokenization.
Figure 4B:
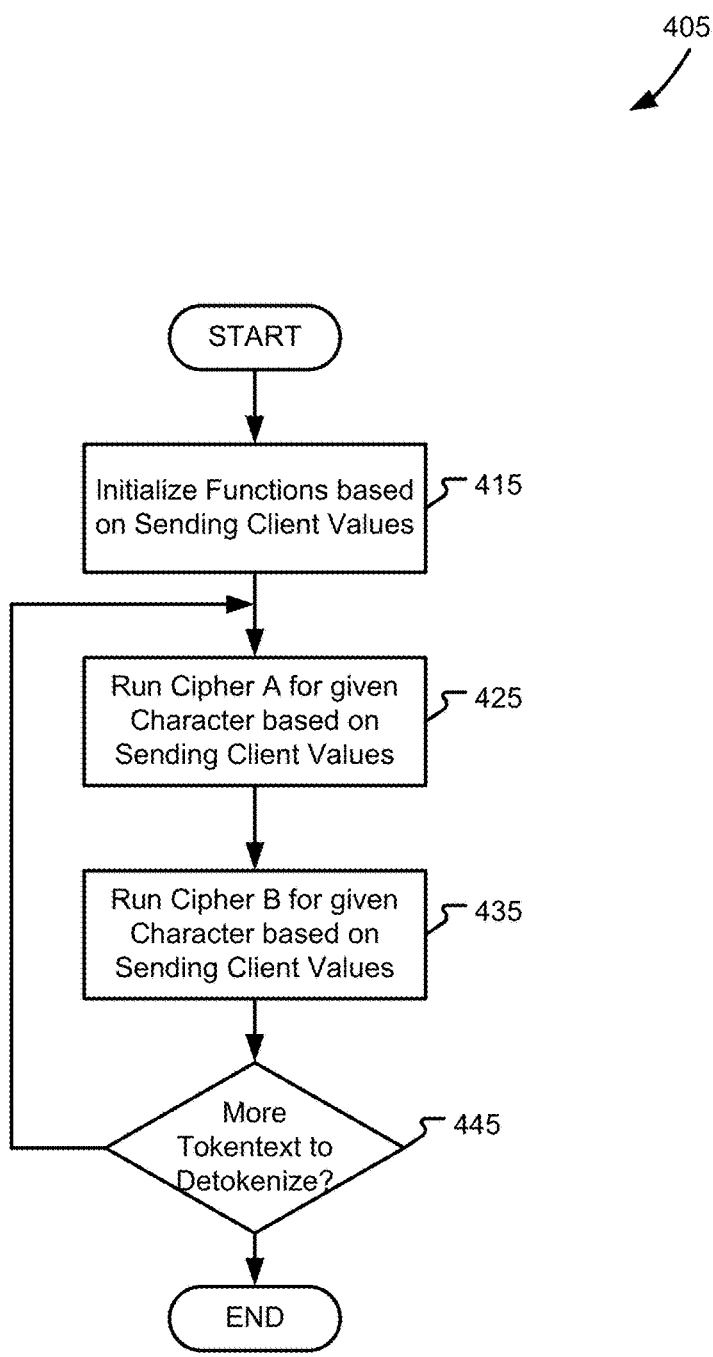
FIG. 4B is a flow chart illustrating general stages in an example method for detokenization.

FIGS. 4A and 4B are flow charts illustrating general stages in an example method 400 for tokenization and an example method 405 for detokenization respectively. Methods 400 and 405 illustrate the unified application of cipher A and cipher B as shown in greater detail in FIGS. 3A-C, and involve similar operations executed with different inputs to produce different outputs.

As illustrated in FIG. 4A, method 400 begins at OPERATION 410, where the cryptographic functions for cipher A and cipher B are initialized using values associated with the receiving party of a message. Cipher A's cryptographic function operates in CFB mode, and is initialized with an initialization vector 340, a key (or a key section 320), and a start character 395, which are all cryptographically secure random numbers associated with the receiving client 150. Cipher B's cryptographic function operates in ECB mode, and is initialized with a key, which in various aspects may be the same key used to initialize cipher A's cryptographic function, or a different cryptographically secure random number associated with the receiving client 150. None of the cryptographically secure random numbers are shared with any of the parties communicating; they are kept privately from the receiving client 150 and the sending party.

Method 400 then proceeds to OPERATION 420, where cipher A is run to produce an output for the first plaintext character 310a being tokenized. The output from cipher A is based on previous runs of cipher A; the output from cipher A for a second plaintext character 310b is based on the output from cipher A for the first plaintext character 310a and the first plaintext character 310a itself. When cipher A is initialized, it will produce its first output based on the initialization vector 340 and the start character 395, but will be updated with its own outputs and the plaintext characters 310 to produce outputs in subsequent runs to update its output for subsequent plaintext characters 310. For example, when tokenizing the word "Hello", the output from cipher A for the letter "H" will be produced at initialization from the initialization vector 340 and the start character 395. The output from cipher A for the letter "e", however, will be produced from the output from cipher A for the letter "H" and the letter "H" itself, replacing the initialization vector 340 and the start character 395, respectively in the operation of cipher A. The discussion in regard to FIG. 3A provides detailed discussion of the operation of cipher A.

Method 400 then proceeds to OPERATION 430, where cipher B is fed the output of cipher A, thereby producing a codebook array 345. In various aspects, the output from cipher A is smaller than the block size required by cipher B. Therefore, an input block 315 of the block size specified for the cryptographic function of cipher B is assembled by concatenating a nonce and a counter with the output from cipher A. For tokenization, the nonce is a cryptographically secure random number associated with the receiving client 150 that is stored privately. The counter is updated every time that the cryptographic function of cipher B is run. Both the counter and the nonce serve to provide additional cryprographic strength to the tokenization process. For a more detailed discussion of the assembly of an input block 315 for cipher B, please refer to FIG. 3B.

Once the output from cipher A for a given plaintext character 310 is input into the cryptographic function of cipher B, a prefix weighting of the results is used to build the codebook array 345 by which the given plaintext character 310 will be converted into a tokentext character 355 that preserves the format of the plaintext. The codebook array 345 has a number of entries equal to the radix of character domain (i.e., those characters are included in the format being preserved for the plaintext). In various aspects, the cryptographic function of cipher B is run a number of times equal to the radix, producing one entry each run, and in other aspects, the cryptographic function of cipher B is run once, and all of the entries are selected from that one run. Each of the entries is associated with the characters comprising the character domain twice; once by matching the index of the entries to the index of the characters comprising the character domain, and once by matching a ranking of the relative values of the entries (i.e., their weights) to the index of the characters comprising the character domain. For purposes of clarity, one of the pairings of the character domain are designated as input domain characters 375 (e.g., those matched to the entries by index to index) and the other are designated as output domain characters 385 (e.g., those matched to the entries by index to weight), and in various aspects which pairing is given which designation may vary.

The plaintext character 310 being tokenized is then compared to the input domain characters 375 of the codebook array 345 to find the input domain character 375 that matches the plaintext character 310. The output domain character 385 corresponding to the matched input domain character 375 (i.e., the one output domain character 385 paired with the same entry as the input domain character 375 matching the plaintext character 310) is then selected as the tokentext character 355 that replaces the plaintext character 310 in the token. A more detailed discussion of the operation cipher B is provided in regard to FIG. 3C.

After tokenizing the given plaintext character 310, method 400 proceeds to DECISION OPERATION 440. At DECISION OPERATION 440, it is determined whether there are more plaintext characters 310 to tokenize.

If there are additional plaintext characters 310 to tokenize, method 400 will repeat a new round of OPERATIONS 420, 430 and 440 for the next plaintext character 310 in the message until it is determined at an execution of DECISION OPERATION 440 that there are no more plaintext characters 310 to tokenize. When repeating OPERATION 420, the output from the previous round of OPERATION 420 is fed back into the cryptographic function of cipher A along with the previous plaintext character 310 (i.e., the plaintext character 310 that was tokenized in the previous round) to update the output of cipher A for use by the cryptographic function of cipher B. In various aspects, the cryptographic function of cipher A is reinitialized with the key (or a next key segment 320), its previous output, and the previous plaintext character 310. When repeating OPERATION 430, a new codebook array 345 is created for the plaintext character 310 being tokenized based on the updated output from cipher A. The plaintext character 310 will then be converted into a tokentext character 355 according to its new codebook array 345, and method 400 will repeat DECISION OPERATION 440.

When it is determined at DECISION OPERATION 440 that there are no more plaintext characters 310 to tokenize, the format preserving token will have been fully created, and method 400 concludes.

FIG. 4B illustrates an example method 405 for detokenization, which varies from the example method 400 for tokenization illustrated in FIG. 4A in several details. Method 405 begins at OPERATION 415, where the cryptographic functions for cipher A and cipher B are initialized using values associated with the sending party of a message. Cipher A's cryptographic function operates in CFB mode, and is initialized with an initialization vector 340, a key (or a key section 320), and a start character 395, which are all cryptographically secure random numbers associated with the sending client 150 (or the submitting party of a query) of a message destined for the receiving party. Cipher B's cryptographic function operates in ECB mode, and is initialized with a key, which in various aspects may be the same key used to initialize cipher A's cryptographic function, or a different cryptographically secure random number associated with the sending client 150 (or the submitting party of a query). None of the cryptographically secure random numbers are shared with any of the parties communicating; they are kept privately from the sending client 150 and the receiving party. The values of the keys, initialization vectors 340, nonces, and start characters 395 for a given client 150 are the same for tokenization (when receiving) or detokenization (when sending).

Method 405 then proceeds to OPERATION 425, where cipher A is run to produce an output for the first tokentext character 355a being detokenized. The output from cipher A during detokenization is based on previous runs of cipher A and cipher B; the output from cipher A for a second tokentext character 355b is based on the output from cipher A for the first tokentext character 355a and the first plaintext character 310a, which is output by cipher B in OPERATION 435. When cipher A is initialized, it will produce its first output based on the initialization vector 340 and the start character 395, but will be updated with its own outputs and the plaintext characters 310 to produce outputs in subsequent rounds to update its output for detokenizing subsequent tokentext characters 355. For example, when detokenizing the word "Hello" from the token "Qgafo", the output from cipher A for the letter "Q" will be produced at initialization from the initialization vector 340 and the start character 395. The output from cipher A for the letter "g", however, will be produced from the output from cipher A for the letter "Q" and the plaintext letter "H", replacing the initialization vector 340 and the start character 395, respectively in the operation of cipher A. For a more detailed discussion of the operation of cipher A, please refer to FIG. 3A.

Method 405 then proceeds to OPERATION 435, where cipher B is fed the output of cipher A, thereby producing a codebook array 345 for detokenization. In various aspects, the output from cipher A is smaller than the block size required by cipher B. Therefore, an input block 315 of the block size specified for the cryptographic function of cipher B is assembled by concatenating a sender's nonce and a counter with the output from cipher A. The sender's nonce is a cryptographically secure random number associated with the sending client 150 that is stored privately. Similarly to tokenization, the counter is updated every time that the cryptographic function of cipher B is run. Both the counter and the nonce serve to provide additional cryprographic strength to the tokenization process. For a more detailed discussion of the assembly of an input block 315 for cipher B, please refer to FIG. 3B.

Once the output from cipher A for a given tokentext character 355 is input into the cryptographic function of cipher B, a prefix weighting of the results is used to build the detokenization codebook array 345 by which the given tokentext character 355 will be converted into the plaintext character 310 from which it originated. The detokenization codebook array 345 has a number of entries equal to the radix of character domain (i.e., which characters are included in the format being preserved for the plaintext). Similarly to tokenization, the codebook array 345 for detokenization will be generated by either running the cryptographic function of cipher B run a number of times equal to the radix of the character domain, producing one entry in the codebook array 345 each run, or the cryptographic function of cipher B is run once, and all of the entries are selected from that one run. Which alternative is used will depend on which choice was made for tokenization; the detokenization codebook array 345 is made by the same methodology and will have the domain characters paired to its entries as in generating the codebook array 345 for tokenization. This produces an identical codebook array 345 for a given client 150 when that client 150 is receiving a message (for tokenization) and when that client is sending a message (for detokenization). For purposes of clarity, the same pairings of domain characters to entries will be referred to as input domain characters 375 and as output domain characters 385, although one of ordinary skill in the art will recognize that the designations may be applied differently in alternative aspects.

The tokentext character 355 being detokenized is then compared to the output domain characters 385 of the codebook array 345 to find the output domain character 385 that matches the tokentext character 355. The input domain character 375 corresponding to the matched output domain character 385 (i.e., the one input domain character 375 paired with the same entry as the output domain character 385 matching the tokentext character 355) is then selected as the plaintext character 310 that replaces the tokentext character 355 in the message. Alternatively, the detokenization codebook array 345 may be constructed in reverse from the tokenization codebook array 345 for a given client 150 so that both the plaintext characters 310 during tokenization and the tokentext characters 355 during detokenization are compared to the same designation of domain character pairing (e.g., both to input domain characters 375) to yield the other as the result of cipher B. For a more detailed discussion of the operation of cipher B, please refer to FIG. 3C.

After detokenizing the given tokentext character 355, method 405 proceeds to DECISION OPERATION 445. At DECISION OPERATION 445, it is determined whether there are more tokentext characters 355 to detokenize.

If there are additional tokentext characters 355 to detokenize, method 405 will repeat a new round of OPERATIONS 425, 435 and 445 for each tokentext character 355 until it is determined at an execution of DECISION OPERATION 445 that there are no more tokentext characters 355 to detokenize. When repeating OPERATION 425, the output from the previous round of OPERATION 425 is fed back into the cryptographic function of cipher A along with the plaintext character 310 produced in the previous round to update the output of cipher A for use by the cryptographic function of cipher B. In various aspects, the cryptographic function of cipher A is reinitialized with the key (or a next key segment 320), its previous output, and the plaintext character 310 just produced. When repeating OPERATION 435, a new detokenization codebook array 345 is created for the tokentext character 355 being tokenized based on the updated output from cipher A. The tokentext character 355 will then be converted into a plaintext character 310 according to its new codebook array 345, and method 405 will repeat DECISION OPERATION 445.

When it is determined at DECISION OPERATION 445 that there are no more tokentext characters 355 to detokenize, the format preserving token will have been fully reverted to its plaintext, and method 405 concludes.

Figure 5:
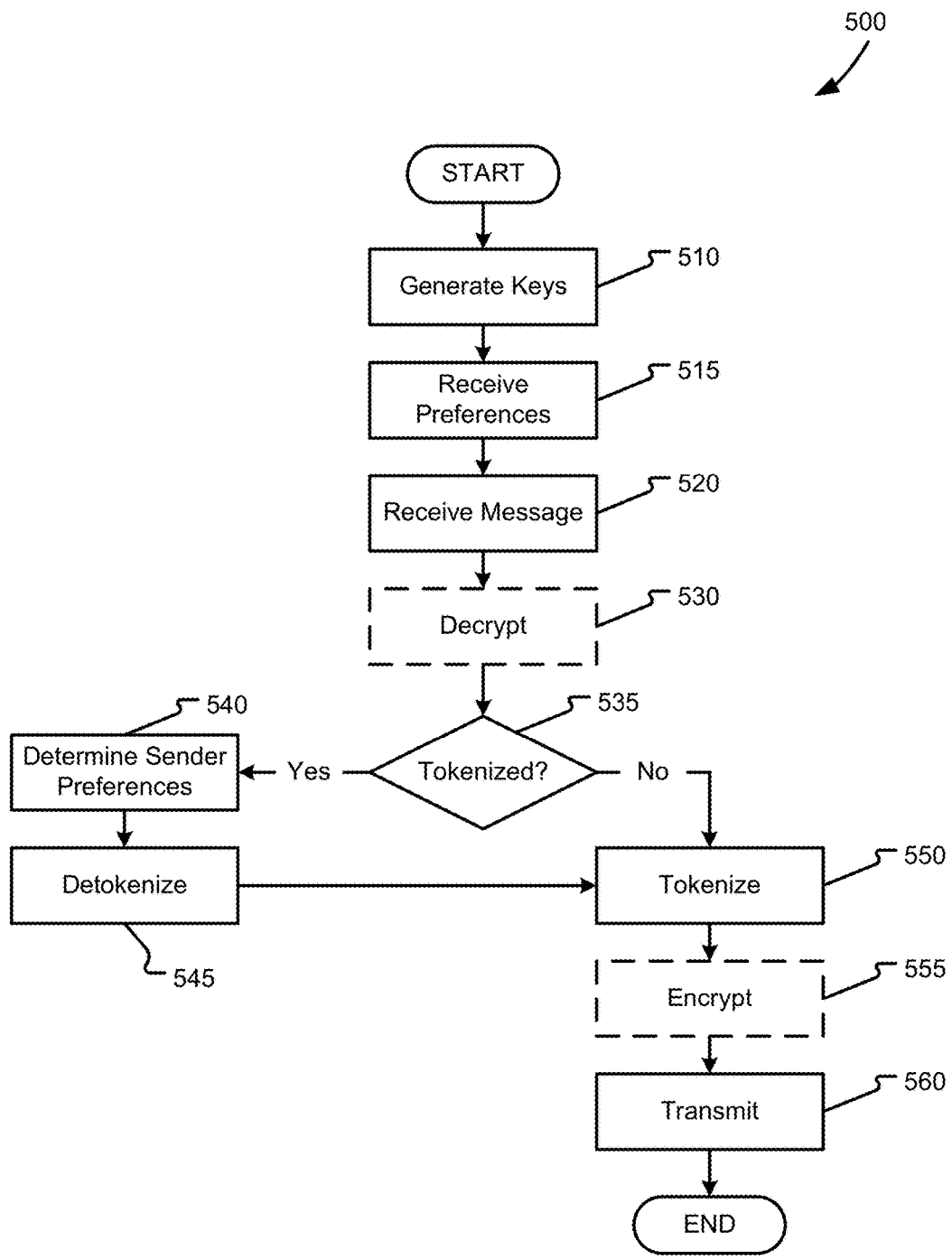
FIG. 5 is a flow chart illustrating general stages in an example method for tokenizing communications between two parties.

FIG. 5 is a flow chart illustrating general stages in an example method 500 for tokenizing communications between two parties. Method 500 begins at OPERATION 510, where keys are generated for each client 150. Keys are a series of random numbers, generated by a cryptographically secure random number generator (CSRNG), which is a device used to produce numbers that cannot be predicted based on patterns or algorithms. In addition to keys used to initiate the functions used in cipher A and cipher B, nonces, start characters 395 and initialization vectors 340 are generated from random numbers at OPERATION 510. The keys, and other random numbers generated at OPERATION 510, are stored privately for each client 150, and are not shared with any of the clients 150 or parties with whom the clients 150 communicate.

Method 500 proceeds to OPERATION 515, where preferences are received for how clients 150 wish to have data transmitted to them handled. The preferences set forth which portions of a communication transmitted to the client 150 are to be tokenized and, conversely, that those portions when transmitted by the client 150 are to be detokenized (and potentially re-tokenized) before being transmitted to the receiving party. The preferences may also set the domain for a given portion of a message to be tokenized, or the domain may be determined by parsing the portion of the message to be tokenized or on a character-by-character basis.

At OPERATION 520, a message destined for a client 150 is received, and if it is encrypted according to a supplemental encryption, it is decrypted at OPTIONAL OPERATION 530. Next, at DETERMINATION 535, it is determined whether the message includes tokens. In various aspects, the determination is made by comparing the sending party to a list of clients 150, such that when the sender is a client 150, it will be determined that the message (or portions thereof) has been tokenized. In some aspects, a message from a sender who is a client 150 may be a query (wherein the sending client 150 and receiving client 150 are the same party, forwarding a message received outside of the FPE system 100 to determine whether it includes tokens) that specifies a submitting party to be used in place of the sending party when determining whether the message has been tokenized. If the message is from a client 150 and is therefore determined to have been potentially tokenized, method 500 proceeds to OPERATION 540. If the message is determined to have potentially not been tokenized (e.g., is not sent from a client 150), method 500 proceeds to OPERATION 550.

At OPERATION 540, the preferences of the sending party are discovered. The FPE system 100 will retrieve preferences set by the client 150 determined to have sent the message in DETERMINATION 535 or a submitting party specified in a query. At OPERATION 545, any portions that are determined to meet the preferences discovered in OPERATION 540 are detokenized. Detokenization is discussed in greater detail in regard to FIGS. 3A-C, and FIG. 4B but, in general, transforms the tokentext back into plaintext for a message on a character-by-character basis. Detokenization uses a unique codebook for each character of the portion being detokenized based on an input block 315 built from the results of a cipher feedback mode cipher's encryption of previous plaintext characters 310 (or a start character 395). Method 500 then proceeds to OPERATION 550.

At OPERATION 550, the message is tokenized according to the preferences of the receiving client 150. Tokenization is discussed in greater detail in regard to FIGS. 3A-C, and FIG. 4A but, in general, transforms the plaintext of a message into tokentext on a character-by-character basis so that the token replaces the portion in the message, but retains the format of the given portion so that the number of characters and the domain of the characters of a tokentext are the same as the number of characters and the domain of the characters of the plaintext. In various aspects, the domain of the characters may be discovered on a character-by-character basis as individual characters are tokenized, or the domain may be discovered for a data segment 210 or a data field, or may be set via a preference from the receiving client 150. Tokenization uses a unique codebook for each character of the portion being tokenized based on an input block 315 built from the results of a cipher feedback mode cipher's encryption of previous plaintext characters 310 (or a start character 395). The codebook constructed for tokenization and in detokenization for a given character within a portion is the same, although whether the given character is matched against the input domain characters 375 to produce the corresponding output domain character 385 or the given character is match against the output domain characters 385 to produce the corresponding input domain character 375 will be reversed.

In aspects where the message is a query, in aspects specified by the receiving client 150, and in instances where a determination cannot be made at DETERMINATION 535, the message will be processed twice: once according to OPERATION 550 and once according to OPERATIONS 540, 545, and 550 so that two messages will be handled in subsequent operations of method 500. The client 150 will then determine which of the two messages received in a query to use and which to discard based on whether the records of the client 150 match the tokens included in the two messages. For example, when a first client 150 receives a message via channels other than the FPE system 100 from a second client 150, and the client 150 does not know whether the message includes tokens (e.g., a phone call from the second client 150), the first client 150 may send a query to the FPE system 100, which returns two tokenized messages. One of the messages will be a tokenization of the message according to the preferences of the first client 150 (according to OPERATION 550) and one of the messages will be a detokenization of the message according to preferences of the second client 150 and a tokenization according to the preferences of the first client 150 (according to OPERATIONS 540, 545 and 550). Whichever message matches the records of the first client 150 will be used as the correct response to the query and the other may be discarded by the first client 150.

After OPERATION 550, method 500 optionally proceeds to OPERATION 555, where a supplemental encryption specified by the receiving client 150 is applied to the message. As will be appreciated, the supplemental encryption affects the entire message may specify several modes or functions of encryption, which may differ from the modes or functions specified in OPTIONAL OPERATION 530 to decrypt the message from the sending party.

At OPERATION 560, the message, including any tokens, is transmitted to the receiving client 150 from the FPE system 100. The message may be transmitted via one of several networks to the client 150, including, but not limited to: a telephone network, the Internet, an intranet, or a cellular network. When multiple messages are destined for the client 150, those messages may be batched (e.g., until X messages are cached, so that X bytes worth of messages are cached, or so that all messages related to a given person/subject are sent at one time). Method 500 then concludes.

Figure 6:
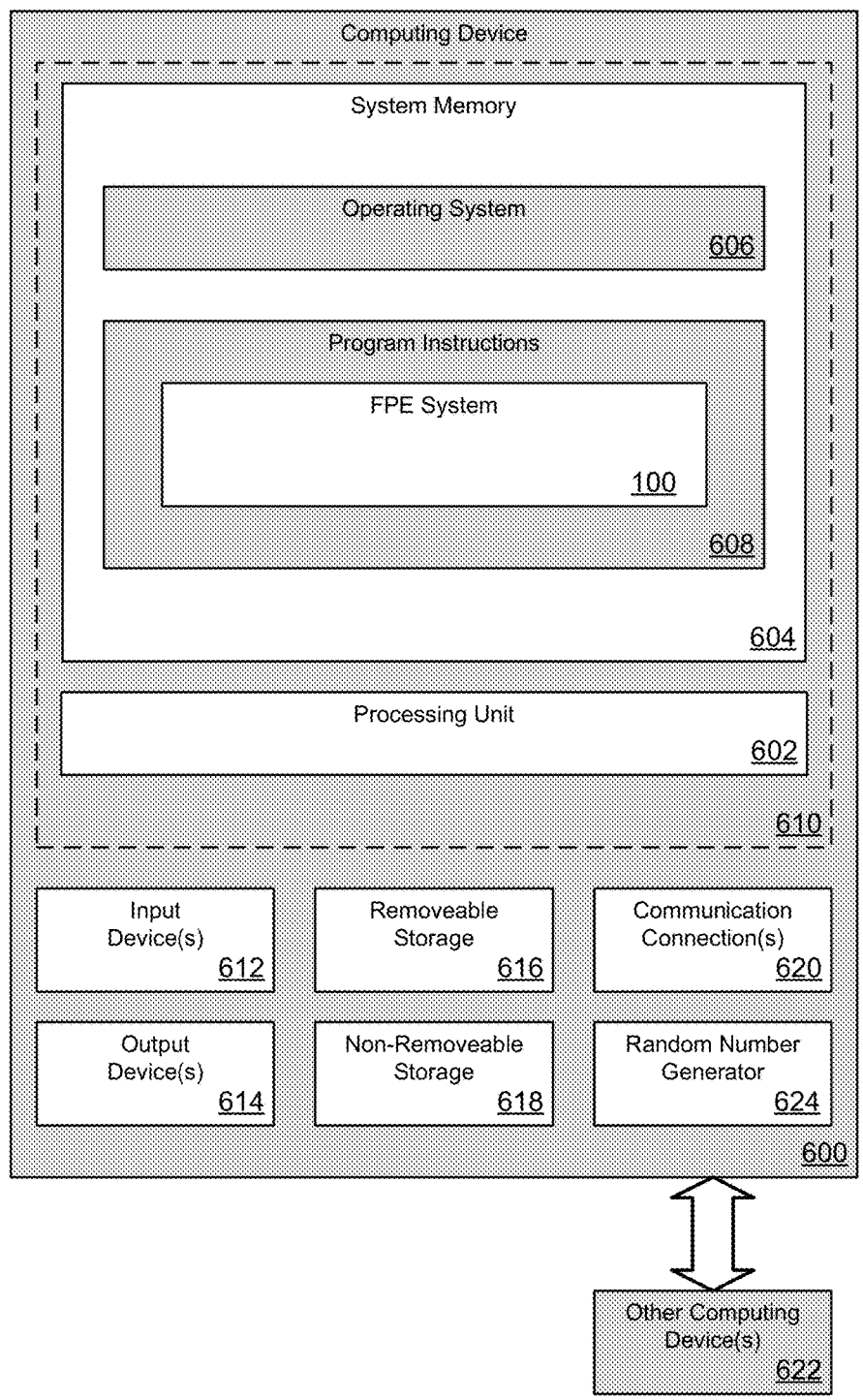
FIG. 6 is a block diagram illustrating physical components of an example computing device with which aspects may be practiced.

FIG. 6 is a block diagram illustrating physical components of an example computing device with which aspects may be practiced. The computing device 600 may include at least one processing unit 602 and a system memory 604. The system memory 604 may comprise, but is not limited to, volatile (e.g. random access memory (RAM)), non-volatile (e.g. read-only memory (ROM)), flash memory, or any combination thereof. System memory 604 may include operating system 606, one or more program instructions 608, and may include an FPE system 100 having sufficient computer-executable instructions, which when executed, perform functionalities as described herein. Operating system 606, for example, may be suitable for controlling the operation of computing device 600. Furthermore, aspects may be practiced in conjunction with a graphics library, other operating systems, or any other application program and is not limited to any particular application or system. This basic configuration is illustrated by those components within a dashed line 610. Computing device 600 may also include one or more input device(s) 612 (keyboard, mouse, pen, touch input device, etc.) and one or more output device(s) 614 (e.g., display, speakers, a printer, etc.).

The computing device 600 may also include additional data storage devices (removable or non-removable) such as, for example, magnetic disks, optical disks, or tape. Such additional storage is illustrated by a removable storage 616 and a non-removable storage 618. Computing device 600 may also contain a communication connection 620 that may allow computing device 600 to communicate with other computing devices 622, such as over a network in a distributed computing environment, for example, an intranet or the Internet. Communication connection 620 is one example of a communication medium, via which computer-readable transmission media (i.e., signals) may be propagated.

The computing device 600 also includes a cryptographically secure random number generator (CSRNG) 624. The CSRNG 624 is operable to provide the computing device 600 with random numbers for use in the FPE system 100, for example as initialization vectors 340, start characters 395, nonces, or as components of a cryptographic key. As one of ordinary skill in the art will understand, a human being is not capable of producing a truly random number without the aid of a machine or device (due to effects such as anchoring and other biases inherent in the human through process), and a truly random number cannot be the result of an algorithm. A computer-implemented CSRNG 624 may produce pseudo-random or truly random numbers depending on how it is implemented, but for increased security, truly random numbers are used in the present disclosure.

Programming modules, may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in any other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage media do not include computer-readable transmission media.

Aspects of the present invention may be used in various distributed computing environments where tasks are performed by remote processing devices that are linked through a communications network.

Aspects of the invention may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 600 or any other computing devices 622, in combination with computing device 600, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A method for improving efficiency at which computer systems use encrypted data by converting a plaintext from a structured document into a token that preserves a format of the plaintext, the method comprising:

by a computing device:
generating a plurality of random numbers to comprise a key, a nonce, an initialization vector, and a start character;
receiving policies from a receiving client;
receiving a transmission including the structured document;
determining, based on the policies, the plaintext from the structured document to be tokenized;
tokenizing the plaintext, wherein tokenizing the plaintext further comprises:
a) breaking the plaintext into a plurality of characters, wherein each character of the plurality of characters is tokenized on a character-by-character basis;
b) determining a domain of characters for the plaintext, the domain having a radix of R;
c) initializing a cryptographic function A with the key, the initialization vector, and the start character to produce an output, wherein the cryptographic function A is a first block cipher operating in cipher feedback mode;
d) initializing a cryptographic function B with the key, wherein the cryptographic function B is a second block cipher operating in electronic codebook mode;
e) creating an input block by concatenating the output from cryptographic function A with a counter and the nonce;
f) incrementing the counter;
g) generating a codebook array having R entries by feeding the input block into the cryptographic function B, wherein the codebook array associates input domain characters with output domain characters for each of the R entries such that each character of the domain is used once for the input domain characters and once for the output domain characters;
h) selecting one output domain character from the codebook array, wherein the selected one output domain character is associated with an input domain character matching a given character being tokenized;
i) reinitializing the cryptographic function A with the key, the output from the cryptographic function A, and the given character to update the output;
j) replacing the given character in the plaintext with the selected one output domain character;
k) repeating steps e through j for a next character of the plurality of characters until all characters of the plurality of characters have undergone steps e though j, thereby forming the token that preserves the format of the plaintext; and
transmitting the structured document to the receiving client.

2. The method of claim 1, wherein generating the codebook array further comprises:
associating, as the input domain characters, characters comprising the domain with each entry in the codebook array, according to an index of the domain and an index of the entries; and
associating, as the output domain characters, the characters comprising the domain with each entry in the codebook array according to the index of the domain and a weight of the entries.

3. The method of claim 1, wherein the policies exclude delineating characters for the structured document from the domain.

4. The method of claim 1, wherein the domain is selected from among:
capital English letters;
lowercase English letters; and
number characters.

5. The method of claim 1, wherein the key used to initialize cryptographic function A and the key used to initialize cryptographic function B are different keys.

6. A cryptographic system for improving efficiency at which computer systems use encrypted data by converting a plaintext into a token that preserves a format of the plaintext, the cryptographic system comprising:
a computer processor and a computer readable storage medium including instructions, which when executed by the processor enable the cryptographic system to:
receive a message destined for a client;
generate, via a cryptographically secure random number generator, a key associated with the client, an initialization vector associated with the client, a start character associated with the client, and a nonce associated with the client;
access policies set by the client, wherein the policies specify data segments comprising the message destined for the client that are to be tokenized;
tokenize the specified data segments, wherein the cryptographic system:
determines a character domain for characters comprising the specified data segments,
initializes a cipher feedback mode cipher with the key, the initialization vector, and the start character to produce an output,
initializes an electronic codebook mode cipher with the key,
assembles an input block from the nonce, a counter value, and the output from the cipher feedback mode cipher,
produces a codebook array by feeding the input block into the electronic codebook mode cipher, wherein the codebook array has a number of entries equal to a radix of the character domain,
associates, as an input domain character, each character of the character domain to one entry of the codebook array based on an index of a given character of the character domain matching an index of the one entry in the codebook array,
associates, as an output domain character, each character of the character domain to one entry of the codebook array based on the index of the given character of the character domain matching a weight of the one entry in the codebook array, wherein the weight is determined by a relative value of the one entry to values of other entries in the codebook array,
matches a plaintext character with one input domain character from the codebook array, and
transforms the plaintext character into a tokentext character, wherein the tokentext character is the corresponding output domain character to the matched input domain character,
wherein the output from the cipher feedback mode cipher uses a previous plaintext character as an input in place of the start character for tokenizing characters after a first plaintext character when producing a new codebook array for each plaintext character of the data segment; and
transmit the message destined for the client to the client.

7. The cryptographic system of claim 6, wherein the character domain excludes special characters, wherein the special characters include end characters for the data segments.

8. The cryptographic system of claim 6, wherein the character domain is determined by the policies, which specify the character domain for the data segments.

9. The cryptographic system of claim 6 further to:
generate, via the cryptographically secure random number generator, a sender key associated with a sending party, an sender initialization vector associated with the sending party, a sender start character associated with the sending party, and a sender nonce associated with the sending party;
access sender policies set by the sending party, wherein the sender policies specify data segments that comprise tokens in the message destined for the client;
prior to tokenizing the message destined for the client, detokenize the tokens in the message destined for the client according to the sender policies, wherein the cryptographic system:
determines a detokenization character domain for characters comprising the tokens,
initializes the cipher feedback mode cipher with the sender key, the sender initialization vector, and the sender start character to produce a sender output,
initializes the electronic codebook mode cipher with the sender key,
assembles a sender input block from the sender nonce, the counter value, and the sender output from the cipher feedback mode cipher,
produces a detokenization codebook array by feeding the sender input block into the electronic codebook mode cipher, wherein the detokenization codebook array has a number of entries equal to a radix of the token character domain,
associates, as a detokenization input domain character, each character of the detokenization character domain to one entry of the detokenization codebook array based on an index of a given character of the detokenization character domain matching an index of the one entry in the detokenization codebook array,
associates, as a detokenization output domain character, each character of the detokenization character domain to one entry of the codebook array based on the index of the given character of the character domain matching the weight of the one entry in the codebook array,
matches a sender tokentext character with one detokenization output domain character from the detokenization codebook array, and
transforms the sender tokentext character into a sender plaintext character, wherein the sender plaintext character is the corresponding detokenization input domain character to the matched detokenization output domain character,
wherein the cipher feedback mode cipher uses a previous plaintext character to a tokentext character being detokenized as an input in place of the start character for detokenizing characters after a first tokentext character when producing a new codebook array for each tokentext character of the tokens.

10. The cryptographic system of claim 6, wherein the cipher feedback mode cipher and the electronic codebook mode cipher use an Advanced Encryption Standard (AES) encryption function.

11. A method for improving efficiency at which computer systems use encrypted data by converting a plaintext into a token that preserves a format of the plaintext, the method comprising:
by a computing device:
receiving a message destined for a client;
generating, via a cryptographically secure random number generator, a key associated with the client, an initialization vector associated with the client, a start character associated with the client, and a nonce associated with the client;

accessing policies set by the client, wherein the policies specify data segments comprising the message destined for the client that are to be tokenized;

tokenizing the specified data segments by:

determining a character domain for characters comprising the specified data segments, initializing a cipher feedback mode cipher with the key, the initialization vector, and the start character to produce an output, initializing an electronic codebook mode cipher with the key, assembling an input block from the nonce, a counter value, and the output from the cipher feedback mode cipher, producing a codebook array by feeding the input block into the electronic codebook mode cipher, wherein the codebook array has a number of entries equal to a radix of the character domain, associating, as an input domain character, each character of the character domain to one entry of the codebook array based on an index of a given character of the character domain matching an index of the one entry in the codebook array, associating, as an output domain character, each character of the character domain to one entry of the codebook array based on the index of the given character of the character domain matching a weight of the one entry in the codebook array, wherein the weight is determined by a relative value of the one entry to values of other entries in the codebook array, matching a plaintext character with one input domain character from the codebook array, and transforming the plaintext character into a tokentext character, wherein the tokentext character is the corresponding output domain character to the matched input domain character, wherein the output from the cipher feedback mode cipher uses a previous plaintext character as an input in place of the start character for tokenizing characters after a first plaintext character when producing a new codebook array for each plaintext character of the data segment; and transmitting the message destined for the client to the client.

12. The method of claim 11, wherein the character domain excludes special characters, wherein the special characters include end characters for the data segments.

13. The method of claim 11, wherein the character domain is determined by the policies, which specify the character domain for the data segments.

14. The method of claim 11, further comprising:

generating, via the cryptographically secure random number generator, a sender key associated with a sending party, an sender initialization vector associated with the sending party, a sender start character associated with the sending party, and a sender nonce associated with the sending party;

accessing sender policies set by the sending party, wherein the sender policies specify data segments that comprise tokens in the message destined for the client;

prior to tokenizing the message destined for the client, detokenizing the tokens in the message destined for the client according to the sender policies by:

determining a detokenization character domain for characters comprising the tokens, initializing the cipher feedback mode cipher with the sender key, the sender initialization vector, and the sender start character to produce a sender output, initializing the electronic codebook mode cipher with the sender key, assembling a sender input block from the sender nonce, the counter value, and the sender output from the cipher feedback mode cipher, producing a detokenization codebook array by feeding the sender input block into the electronic codebook mode cipher, wherein the detokenization codebook array has a number of entries equal to a radix of the token character domain, associating, as a detokenization input domain character, each character of the detokenization character domain to one entry of the detokenization codebook array based on an index of a given character of the detokenization character domain matching an index of the one entry in the detokenization codebook array, associating, as a detokenization output domain character, each character of the detokenization character domain to one entry of the codebook array based on the index of the given character of the character domain matching the weight of the one entry in the codebook array, matching a sender tokentext character with one detokenization output domain character from the detokenization codebook array, and transforming the sender tokentext character into a sender plaintext character, wherein the sender plaintext character is the corresponding detokenization input domain character to the matched detokenization output domain character, wherein the cipher feedback mode cipher uses a previous plaintext character to a tokentext character being detokenized as an input in place of the start character for detokenizing characters after a first tokentext character when producing a new codebook array for each tokentext character of the tokens.

15. The method of claim 11, wherein the cipher feedback mode cipher and the electronic codebook mode cipher use an Advanced Encryption Standard (AES) encryption function.

16. The method of claim 11, further comprising:

associating, as input domain characters, characters comprising the domain with each entry in the codebook array, according to an index of the domain and an index of the entries; and associating, as output domain characters, the characters comprising the domain with each entry in the codebook array according to the index of the domain and a weight of the entries.

17. The method of claim 11, wherein the policies exclude delineating characters for a structured document from the domain.

18. The method of claim 11, wherein the character domain includes:

capital English letters;

lowercase English letters; and number characters.

19. The method of claim 11, wherein different keys are used to initialize different cryptographic functions.

20. The method of claim 11, further comprising decrypting the message according to a supplemental encryption.

* * * * *